(12) United States Patent
Taniguchi et al.

(10) Patent No.: US 9,125,178 B2
(45) Date of Patent: Sep. 1, 2015

(54) WIRELESS COMMUNICATION SYSTEM, WIRELESS COMMUNICATION CENTER MODULE, WIRELESS COMMUNICATION METHOD, AND METHOD AND PROGRAM FOR RELAYING WIRELESS COMMUNICATION

(75) Inventors: Shouhei Taniguchi, Kanagawa (JP); Yoshihide Nakashima, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/350,787

(22) PCT Filed: Mar. 8, 2012

(86) PCT No.: PCT/JP2012/001600
§ 371 (c)(1),
(2), (4) Date: Apr. 9, 2014

(87) PCT Pub. No.: WO2013/057849
PCT Pub. Date: Apr. 25, 2013

(65) Prior Publication Data
US 2014/0295904 A1  Oct. 2, 2014

(30) Foreign Application Priority Data

Oct. 21, 2011  (JP) ................. 2011-231203

(51) Int. Cl.
*H04B 7/00* (2006.01)
*H04W 76/00* (2009.01)
(Continued)

(52) U.S. Cl.
CPC ........... *H04W 76/007* (2013.01); *G08B 25/016* (2013.01); *G08B 25/10* (2013.01); *G08B 27/005* (2013.01); *H04W 72/005* (2013.01); *H04W 4/22* (2013.01)

(58) Field of Classification Search
USPC ............... 455/41.2, 41.3, 420, 515, 450–453, 455/464, 509
See application file for complete search history.

(56) References Cited

U.S. PATENT DOCUMENTS 7,450,969 B1 * 11/2008 Cockayne ..................... 455/566
7,451,920 B1 * 11/2008 Rose ............................. 235/380
(Continued)

FOREIGN PATENT DOCUMENTS

EP  0 077 668 A1  10/1982
EP  1 239 435 A2  9/2002
(Continued)

OTHER PUBLICATIONS

International Search Report, dated Sep. 3, 2013, for corresponding International Application No. PCT/JP2012/001600, 4 pages.
(Continued)

*Primary Examiner* — Dominic E Rego
(74) *Attorney, Agent, or Firm* — Seed IP Law Group PLLC

(57) ABSTRACT

There is provided a wireless communication system which solves various problems generated by allowing a terminal to transmit an emergency alert. In the wireless communication system, an emergency alert terminal (210) includes an emergency alert section (211) for broadcasting an emergency alert, and a connection request terminal (220) includes a connection request section (221) for transmitting a connection request signal to request connection to an emergency alert terminal (210). The emergency alert terminal (210) includes an automatic communication initiation section (212) for allowing a communication with the connection request terminal (220) upon transmission of the connection request signal from the connection request section (221) of the connection request terminal (220) after transmission of the emergency alert.

7 Claims, 14 Drawing Sheets

(51) Int. Cl.
*G08B 25/01* (2006.01)
*G08B 25/10* (2006.01)
*G08B 27/00* (2006.01)
*H04W 72/00* (2009.01)
*H04W 4/22* (2009.01)

(56) References Cited

U.S. PATENT DOCUMENTS

| | | | |
|---|---|---|---|
| 8,884,758 B2 | 11/2014 | Taniguchi et al. | |
| 8,897,760 B1* | 11/2014 | Nasserbakht et al. | 455/417 |
| 2002/0037734 A1* | 3/2002 | McKenna et al. | 455/517 |
| 2005/0073433 A1* | 4/2005 | Gunderson et al. | 340/903 |
| 2005/0080786 A1* | 4/2005 | Fish et al. | 707/10 |
| 2007/0002858 A1* | 1/2007 | Bichot et al. | 370/390 |
| 2008/0125172 A1* | 5/2008 | Leon et al. | 455/557 |
| 2008/0153417 A1* | 6/2008 | Bhakta et al. | 455/41.2 |
| 2008/0162036 A1* | 7/2008 | Breed | 701/207 |
| 2009/0019113 A1* | 1/2009 | Wu et al. | 709/204 |
| 2009/0233574 A1* | 9/2009 | Shinozaki | 455/404.2 |
| 2010/0127863 A1* | 5/2010 | Kim et al. | 340/540 |
| 2010/0205534 A1* | 8/2010 | Zellner et al. | 715/733 |
| 2010/0218209 A1* | 8/2010 | Kendall | 725/33 |
| 2012/0306650 A1 | 12/2012 | Taniguchi et al. | |
| 2015/0022354 A1 | 1/2015 | Taniguchi et al. | |

FOREIGN PATENT DOCUMENTS

| | | |
|---|---|---|
| JP | 03-227145 A | 10/1991 |
| JP | 06-140987 A | 5/1994 |
| JP | 08-315281 A | 11/1996 |
| JP | 2007-034441 A | 2/2007 |
| WO | 2011/102141 A1 | 8/2011 |

OTHER PUBLICATIONS

Written Opinion of the International Preliminary Examining Authority, dated Feb. 11, 2014, for corresponding International Application No. PCT/JP2012/001600, 23 pages.

Japanese Office Action dated Apr. 28, 2015, for Corresponding JP Application No. 2014-518860, 3 pages.

* cited by examiner

[Fig. 4]
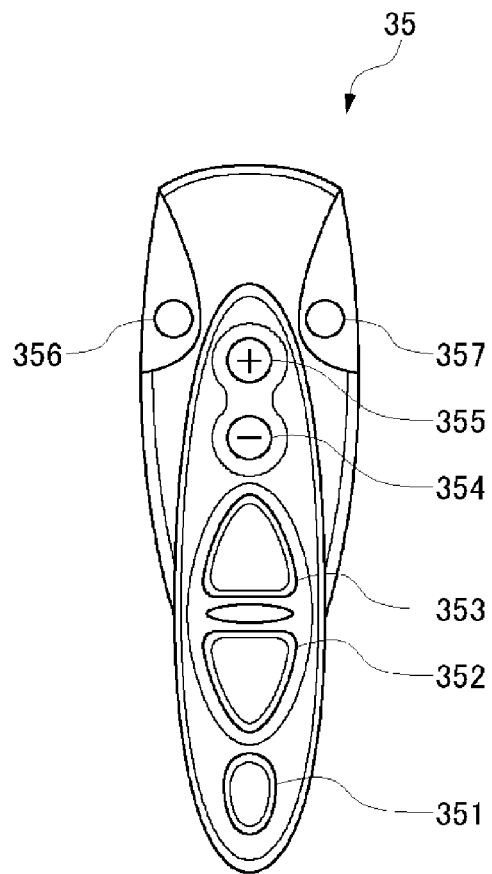
Fig. 5
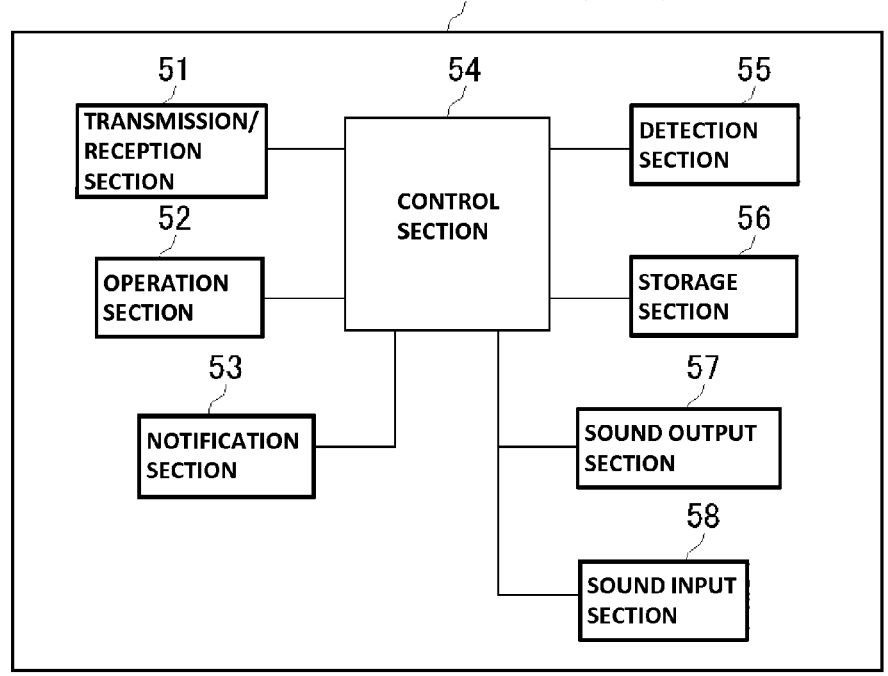

Fig. 8

| RECEPTION-SIDE SLAVE UNIT \ TRANSMISSION-SIDE SLAVE UNIT | MG | SMG | CL1 | CL2 | TEL | KTN | DRT |
|---|---|---|---|---|---|---|---|
| MG | — | O/× | O/× | O/× | O/× | O/× | O/× |
| SMG | O/× | — | O/× | O/× | O/× | O/× | O/× |
| CL1 | O/× | O/× | — | O/× | O/× | O/× | O/× |
| CL2 | O/× | O/× | O/× | — | O/× | O/× | O/× |
| TEL | × | × | × | × | — | × | — |
| KTN | O/× | O/× | O/× | O/× | × | — | × |
| DRT | × | × | × | × | — | × | — |

Fig. 9

| RECEPTION-SIDE SLAVE UNIT \ TRANSMISSION-SIDE SLAVE UNIT | MG | SMG | CL1 | CL2 | TEL | KTN | DRT |
|---|---|---|---|---|---|---|---|
| MG | — | O | O/× | O/× | × | O/× | × |
| SMG | O | — | O/× | O/× | × | O/× | × |
| CL1 | O | O | — | O/× | × | O/× | × |
| CL2 | O | O | O/× | — | × | O/× | × |
| TEL | × | × | × | × | — | × | — |
| KTN | × | × | × | × | × | — | × |
| DRT | × | × | × | × | — | × | — |

| TRANSMISSION-SIDE SLAVE UNIT / RECEPTION-SIDE SLAVE UNIT | MG | SMG | CL1 | CL2 | TEL | KTN | DRT |
|---|---|---|---|---|---|---|---|
| MG | — | O | O | O | × | O | × |
| SMG | O | — | O | O | × | O | × |
| CL1 | O | O | — | O | × | O | × |
| CL2 | O | O | O | — | × | O | × |
| TEL | × | × | × | × | — | × | — |
| KTN | O | O | O | O | × | — | × |
| DRT | × | × | × | × | — | × | — |

WIRELESS COMMUNICATION SYSTEM, WIRELESS COMMUNICATION CENTER MODULE, WIRELESS COMMUNICATION METHOD, AND METHOD AND PROGRAM FOR RELAYING WIRELESS COMMUNICATION

RELATED APPLICATION

This application claims priority of Japanese Patent Application No. 2011-231203 filed on Oct. 21, 2011, which is incorporated herein by reference.

TECHNICAL FIELD

The present invention relates to wireless communication systems and wireless communication methods, and more particularly, the present invention relates to a wireless communication system and a wireless communication method which enable a wireless communication terminal to transmit an emergency alert.

BACKGROUND ART

A wireless communication system is known in which a plurality of wireless communication terminal (hereinafter simply referred to as "terminal") perform a wireless communication with each other. One type of the wireless communication system is structured so that terminals directly communicate with each other by radio, while the other type is structured so that a wireless communication center module (hereinafter simply referred to as "center module") as a wireless communication relay, which controls the communication state of a plurality of terminals, performs radio communication with a plurality of the terminals, by which the terminals implement a communication with each other via the center module. Such wireless communication systems are applied as a wireless communication system for use, for example, in restaurants. Hereinafter, a description will be given of a conventional wireless communication system by taking as an example the case where a wireless communication system, composed of a plurality of terminals and a center module which controls the communication state of these terminals, is used in restaurants, more particularly in quick service restaurants having drive-thru facility.

When this kind of wireless communication system is used in a quick service restaurant, a center module is placed at an appropriate spot (near an order counter for example) inside the restaurant. The terminals include a terminal as a intercommunication equipment (hereinafter abbreviated as "intercom") carried by staff members including a manager (store manager), a sub-manager (assistant manager), and store personnel (salesclerks), a menu board having a microphone and a speaker for use by drive-thru customers as a part of a drive-thru system including a confirmation order display (COD), and a kitchen terminal placed inside the kitchen.

The terminals for the manager and the sub-manager are provided with a manager setting. The wireless communication system has a plurality of communication channels. In this example, four channels are assumed to be provided. Out of these channels, one channel is reserved exclusively for the terminals with the manager setting (hereinafter referred to as "terminal with manager setting"), and the rest of three channels are used by other terminals (hereinafter referred to as "terminal with general setting").

For the communication of the terminals with general setting, every time a terminal performs a communication, a communication channel is assigned thereto. Since three channels are assigned to the terminals with general setting in this example, the terminals with general setting can simultaneously perform a communication with use of up to three communication channels. However, since the number of communication channels which can be assigned to the terminals with general setting is limited to three, four or more terminals with general setting cannot perform a communication at the same time. When a terminal with general setting initiates a new communication while other terminals with general setting are already using the three communication channels, the terminal with general setting, which initiated a communication the earliest among the terminals with general setting that already initiated their communications, is forced to be disconnected from its communication to give up the communication channel for the communication of the new terminal with general setting.

In the conventional wireless communication system, page mode and talk mode are provided as a communication mode. The page mode is the mode which disconnects a communication with the customer and connects a communication only with the staff members. More specifically, in the page mode, the menu board having a speaker as a sound output section is disconnected from the wireless communication system, so that a call sound is not emitted from the speaker of the menu board. Use of the page mode allows business communication between the staff members. In the talk mode, the terminals including the menu board can perform a communication, so that the talk mode is used in the normal operation such as taking orders at the drive-thru.

The staff member can perform a communication by specifying the page mode or the talk mode by operating a button provided on the intercom that is a terminal. The drive-thru system includes a vehicle sensor for detecting a vehicle which places an order at the drive-thru. The talk mode is also started upon detection of the vehicle by the vehicle sensor.

Since one of four communication channels is reserved for the terminals with manager setting, the terminals with manager setting can perform a communication any time regardless of the using state of the three remaining communication channels. Accordingly, the manager and the sub-manager can reliably provide emergency or important notifications to other staff members.

CITATION LIST

Patent Literature

[Patent Literature 1] Japanese Patent Laid-Open No. 6-140987

SUMMARY OF INVENTION

Technical Problem

In such a wireless communication system, there are demands for allowing, in the case of an emergency or serious situation (e.g., occurrence of fire and burglary, which are hereinafter simply referred to as "emergency"), the terminals with general setting to reliably notify other staff members of the occurrence of an emergency. In response to the demands, a wireless communication system can be considered in which the terminals with general setting have an emergency alert function for notifying other staff members of the occurrence of an emergency by broadcast communication upon execution of specific operation in order to notify other staff members of the occurrence of the emergency.

However, in the wireless communication system, if the terminals with general setting for use by store personnel and the like are allowed to perform an emergency alert, the following problems arise.

If the broadcasting of the emergency alert is terminated while other staff members cannot confirm whether or not the emergency situation indicated by the emergency alert transmission is under control, then the other staff members are left uncertain about whether or not the emergency situation is under control.

In this case, while other staff members including the manager can perform a communication in the page mode or the talk mode to the person who transmitted the emergency alert (hereinafter referred to as "emergency alert sender") to request a report on the detail of the situation, the emergency alert sender sometimes cannot execute specified operation on the intercom and therefore cannot initiate a communication due to the emergency situation (due to, for example, occurrence of fire, being threatened by burglars, and being too panicked to operate the intercom).

A communication may be performed without the emergency alert sender operating the intercom if one of other staff members (the manager for example) forcedly initiates a mutual communication with the emergency alert sender to confirm the situation with the sender. However, the other staff members may be unable to identify who the emergency alert sender is in the first place.

In view of solving the above-stated problems, the purpose of the present invention is to provide a wireless communication system which solves the above-mentioned problems generated by allowing a terminal to transmit an emergency alert.

Solution to Problem

In order to solve the conventional problems, a wireless communication system of the present invention includes a plurality of terminals which perform a wireless communication with each other, in which at least some terminals out of a plurality of the terminals have an emergency alert function, while at least some terminals out of a plurality of the terminals have a connection request function, the terminal having the emergency alert function includes an emergency alert section for broadcasting an emergency alert, the terminal having the connection request function includes a connection request section for transmitting a connection request signal to a terminal which transmitted the emergency alert, and the terminal having the emergency alert function includes an automatic communication initiation section for allowing, after the terminal transmitted the emergency alert, a communication with another terminal having the connection request function, other than the terminal which transmitted the emergency alert, upon transmission of the connection request signal from the connection request section of the another terminal.

Another aspect of the present invention is a center module in a wireless communication system including the center module and a plurality of terminals, a plurality of the terminals making a wireless communication with each other via the center module. In this system, at least some terminals out of a plurality of the terminals have an emergency alert function, and at least some terminals out of a plurality of the terminals have a connection request function. The center module includes: a broadcast communication section for, in response to reception of the emergency alert signal from the terminal having the emergency alert function, broadcasting the emergency alert from the terminal which transmitted the emergency alert signal to other terminals; and a communication control section for, in response to reception of a connection request signal from the terminal having the connection request function, transmitting a communication control signal to put the terminal which transmitted the emergency alert in a communicable state, and after the terminal which transmitted the emergency alert is in the communicable state in response to reception of the communication control signal, the broadcast communication section transmits a sound from the terminal which transmitted the emergency alert to the terminals other than the terminal which transmitted the emergency alert.

Still another aspect of the present invention is a wireless communication method in a wireless communication system including a center module and a plurality of terminals, a plurality of the terminals making a wireless communication with each other via the center module. In this method, at least some terminals out of a plurality of the terminals have an emergency alert function, while at least some terminals out of a plurality of the terminals have a connection request function. The wireless communication method includes: an emergency alert transmission step of, in the terminal having the emergency alert function, transmitting to the center module an emergency alert signal for broadcasting an emergency alert; a broadcast communication step of, in the center module, broadcasting the emergency alert to the terminals other than the terminal which transmitted the emergency alert signal; an emergency alert termination step of, in the center module, terminating broadcasting of the emergency alert; a connection request transmission step of, in the terminal having the connection request function, transmitting a connection request signal to the terminal which transmitted the emergency alert; a communication control step of, in the center module, transmitting a communication control signal, in response to reception of the connection request signal, to put the terminal which transmitted the emergency alert in a communicable state; and an automatic communication initiation step of, in the terminal which transmitted the emergency alert at the emergency alert transmission step, automatically allowing a communication with the terminal which transmitted the connection request signal in response to reception of the communication control signal transmitted at the communication control step.

Still another aspect of the present invention is a method for relaying a wireless communication in a center module in a wireless communication system including the center module and a plurality of terminals, a plurality of the terminals making a wireless communication with each other via the center module. In this method, at least some terminals out of a plurality of the terminals have an emergency alert function, while at least some terminals out of a plurality of the terminals have a connection request function. The method for relaying a wireless communication includes: a broadcast communication step of, in response to reception of an emergency alert signal from the terminal having the emergency alert function, broadcasting the emergency alert to the terminals other than the terminal which transmitted the emergency alert signal; an emergency alert termination step of terminating broadcasting of the emergency alert; a communication control step of, in response to reception of a connection request signal from the terminal having the connection request function, transmitting a communication control signal to put the terminal which transmitted the emergency alert in a communicable state; and a relaying step of, after the terminal which transmitted the emergency alert is in the communicable state in response to reception of the communication control signal, transmitting a sound from the terminal which transmitted the emergency alert to the terminals other than the terminal which transmitted the emergency alert.

Still another aspect of the present invention is a program for executing a method for relaying a wireless communication, the program being executed by a center module.

Advantageous Effect of Invention

According to the present invention, an emergency alert is broadcasted by a terminal having an emergency alert function. To acquire further information from the emergency alert sender in a terminal having the connection request function after the broadcasting of the emergency alert, a connection request signal is transmitted from the terminal having the connection request function so that the terminal of the emergency alert sender is automatically put in a communicable state. Consequently, even when another user, who hopes to acquire further information after termination of the emergency alert transmission, does not know who the emergency alert sender is, a communication with the terminal of the emergency alert sender can be established only by transmitting the connection request signal from the terminal of the another user having the connection request function. Moreover, once the connection request signal is transmitted, a communication is automatically initiated in the terminal of the emergency alert sender, and therefore even when the emergency alert sender is in the situation where operation to initiate a communication with other terminals is impossible, the emergency alert sender can perform a communication with other terminals after termination of the emergency alert transmission.

As shown in the following description, the present invention includes other aspects. Therefore, the disclosure of the invention is intended to provide only a part of the invention, and is not intended to limit the scope of the invention described and claimed herein.

BRIEF DESCRIPTION OF DRAWINGS

FIG. 4 is an enlarged view showing an operation section of the headset in an embodiment of the present invention.

FIG. 5 is a view showing the structure of a manager terminal and the like in an embodiment of the present invention.

FIG. 8 is a view showing a sound routing table in talk mode in an embodiment of the present invention.

FIG. 9 is a view showing a sound routing table in page mode in an embodiment of the present invention.

DESCRIPTION OF EMBODIMENTS

Figure 1:
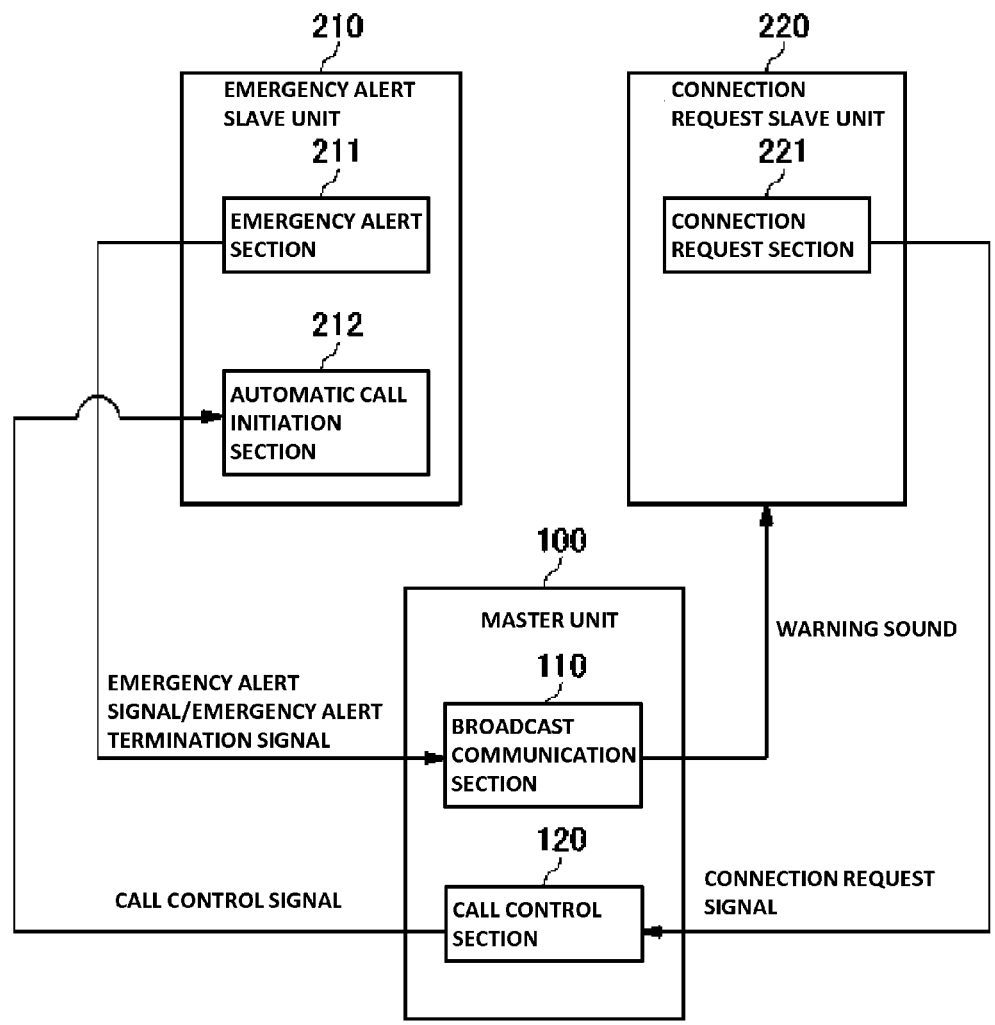
FIG. 1 is a view showing operation of emergency alert transmission in a first embodiment of the present invention.

Hereinafter, the present invention will be described in detail. Since the embodiments described below are illustrative only, the present invention may be modified to various forms. It should be understood, therefore, that the specific structures and functions disclosed below do not limit the range of claims.

A wireless communication system in an embodiment of the present invention includes a plurality of terminals which perform a wireless communication with each other, in which at least some terminals out of a plurality of the terminals have an emergency alert function, while at least some terminals out of a plurality of the terminals have a connection request function, the terminal having the emergency alert function includes an emergency alert section for broadcasting the emergency alert, the terminal having the connection request function includes a connection request section for transmitting a connection request signal to the terminal which transmitted the emergency alert, the terminal having the emergency alert function includes an automatic communication initiation section for allowing, after the terminal made an emergency alert, a communication with another terminal having the connection request function, other than the terminal which transmitted the emergency alert, upon transmission of the connection request signal from the connection request section of the another terminal.

According to the structure, an emergency alert is broadcasted by a terminal having the emergency alert function. To acquire further information from the emergency alert sender in a terminal having the connection request function after the broadcasting of the emergency alert, a connection request signal is transmitted from the terminal having the connection request function so that the terminal of the emergency alert sender is automatically put in a communicable state. Consequently, even when another user, who hopes to acquire further information after termination of transmission of the emergency alert, does not know who the emergency alert sender is, a communication with the terminal of the emergency alert sender can be established only by performing connection request operation on the terminal of the another user having the connection request function. Moreover, once the connection request signal is transmitted, a communication is automatically (i.e., without specific operation by user) initiated in the terminal of the emergency alert sender, and therefore even when the emergency alert sender is in the situation where operation to initiate a communication with other terminals is impossible, the emergency alert sender can perform a communication with other terminals after termination of transmission of the emergency alert.

The above-mentioned wireless communication system may further include a center module, in which a plurality of the terminals may perform a wireless communication with each other via the center module, the emergency alert section may transmit an emergency alert signal to the center module, the connection request section may transmit a connection request signal to the center module, the center module may include: a broadcast communication section for, in response to reception of the emergency alert signal, broadcasting an emergency alert to the terminals other than the terminal which transmitted the emergency alert signal; and a communication control section for, in response to reception of the connection request signal, transmitting a communication control signal to put the terminal which transmitted the emergency alert in a communicable state, and the automatic communication initiation section may automatically allows a communication with the terminal which transmitted the connection request signal in response to reception of the communication control signal.

According to the structure, the wireless communication system having a plurality of the terminals which perform a wireless communication with each other via the center module can avoid various problems arising from emergency alert transmitted from the terminal having the emergency alert function.

In the aforementioned wireless communication system, the broadcast communication section may preferentially reserve a communication channel used for a wireless communication to broadcast an emergency alert.

In the case where a communication channel for broadcasting an emergency alert is not preferentially reserved, the broadcasting of the emergency alert may be disconnected because the number of communication channels prepared for the wireless communication system is limited and the limited number of the communication channels may be used by a plurality of users. Although the emergency alert sender may use a communication channel by sending another emergency alert after the broadcasting of the original emergency alert is disconnected, the emergency alert sender may find it difficult to repeatedly perform operation to initiate a communication due to the emergency situation (due to, for example, occurrence of fire, being threatened by burglars, and being too panicked to operate the intercom). In comparison, the above-stated structure perform s it possible to reserve a communication channel for the broadcasting of an emergency alert, which ensures notification of emergency regardless of interrupt by other users.

In the aforementioned wireless communication system, at least some terminals out of a plurality of the terminals may have both the emergency alert function and the connection request function.

According to the structure, the users having the possibility of sending an emergency alert themselves, if having time and labor to spare to other users who encountered emergency, can transmit a connection request to help other users. When the aforementioned wireless communication system is applied as a wireless communication system for use in restaurants, the connection request function may be provided only to, for example, the terminals for the manager and the sub-manager.

In the above-stated wireless communication system, all the terminals out of a plurality of the terminals may have both the emergency alert function and the connection request function.

According to the structure, all the terminals may have the same structure.

In the above-mentioned wireless communication system, after the terminal which transmitted the emergency alert is in the communicable state in response to reception of a communication control signal, the center module may transmit a sound from the terminal which transmitted the emergency alert only to the terminal which transmitted the connection request signal.

According to the structure, a mutual one-on-one communication may be performed between the terminal which transmitted the connection request signal and the terminal which transmitted the emergency alert, so that the emergency alert sender can provide the connection requester with a report including confidential matters unsuitable to be heard by other users.

In the above-mentioned wireless communication system, after the terminal which transmitted the emergency alert is in the communicable state in response to reception of the communication control signal, the center module may broadcast the sound from the terminal which transmitted the emergency alert to a plurality of the terminals.

According to this structure, details of the situation regarding the emergency can simultaneously be reported from the terminal of the emergency alert sender to a plurality of other terminals.

In the above-stated wireless communication system, broadcasting of the emergency alert may be broadcasting of a previously-prepared sound. The previously-prepared sound may be, for example, a beep sound and may be an announcement sound announcing "emergency occurred" and the like.

In the above-stated wireless communication system, broadcasting of the emergency alert may be broadcasting of a voice of a user of the terminal which transmitted the emergency alert.

According to the structure, the user who is an emergency alert sender can report the occurrence of an emergency to other terminals by his/her own voice.

In the above-stated wireless communication system, the center module may transmit by broadcast communication an emergency alert notification signal notifying transmission of the emergency alert for a fixed period of time after termination of transmission of the emergency alert, and the terminal may include an emergency alert notification section for notifying the user of the terminal that the emergency alert notification signal was received.

In the case where a terminal other than the terminal of the emergency alert sender was not turned on or outside a wireless communication service range at the time when an emergency alert was transmitted, and then the terminal is turned on or moves inside the wireless communication service range after termination of transmission of the emergency alert, the user of the terminal is unable to know that an emergency occurred and the emergency alert thereof was transmitted. In contrast thereto, according to the structure disclosed, when the terminal which is turned on or moves into the wireless communication service range after termination of transmission of the emergency alert receives an emergency alert notification signal, the user of the terminal is notified of the reception of the signal, and therefore the above problem can be solved. It is to be noted that the emergency alert notification section may be a notification section through the visual sense by lighting or blinking a lamp and the like, a notification section through the auditory sense by emission of a notification sound and the like, and may be a notification section through the tactile sense such as a vibrator.

In the above-stated wireless communication system, a plurality of the terminals may include a terminal having a response function, the terminal having the response function may include a response section for transmitting a response signal for responding to the emergency alert in accordance with specified operation by the user, and the broadcast communication section may terminate broadcasting of the emergency alert in response to reception of the response signal.

There may be a case where an emergency alert sender who performed emergency alert operation may become nervous because the sender does not know whether or not the emergency alert was actually transmitted and acknowledged by other users. In this case, according to the structure disclosed, the emergency alert sender may be relieved to know, by the termination of transmission of the emergency alert that the sender has transmitted, that the emergency alert was acknowledged by any one of the users. Further, there may be a case where a false emergency alert is accidentally transmitted by a user who misinterprets the situation. In this case, according to the structure disclosed, any user who has noticed that the emergency alert was an error can terminate of transmission of the emergency alert.

In the above-stated wireless communication system, some terminals out of a plurality of the terminals may include a speaker, some terminals out of a plurality of the terminals may include a speaker control section for transmitting a speaker control signal for controlling so that the sound of the emergency alert is outputted or not outputted from the speaker, and the broadcast communication section of the center module may transmit or stop transmitting the sound of the emergency alert to the terminal having the speaker in response to reception of the speaker control signal.

Depending on the nature of an emergency, some details of the emergency may be unsuitable to be heard by many people (e.g., customers in the case where the wireless communication system is used in restaurants) due to high confidentiality of the situation, whereas some details of the emergency may be encouraged to be heard by many people as their prompt action is needed. However, if a plurality of the terminals include a terminal having a speaker by which a sound is heard by many people, and an emergency alert is broadcasted to all the terminals including such a terminal, then the sound of the emergency alert is outputted from the speaker and is unfortunately heard by many people without exception. On the contrary, according to the structure disclosed, when there is an emergency alert, the sound of the emergency alert outputted from the speaker can be turned on/off on the terminal, so that in the case of the emergency alert necessary to be heard by many people, the sound is controlled to be outputted from the speaker, whereas in the case of the emergency alert unsuitable to be heard by many people, the sound is controlled not to be outputted from the speaker. For example, the sound of the emergency alert outputted from the speaker may be turned off by default, and when the user of a terminal determines from the content of an emergency alert that the alert needs to be heard by many people, specified operation may be performed on the terminal of the user to transmit a speaker control signal for turning on the output of the sound of the emergency alert from the speaker.

In the above-stated wireless communication system, when the broadcast communication section of the center module broadcasts, in response to reception of the emergency alert signal, an emergency alert to the terminals other than the terminal which transmitted the emergency alert signal, the broadcast communication section may stop relaying communications between the terminals other than the terminal which transmitted the emergency alert signal.

When a plurality of users perform a communication using a plurality of communication channels in the wireless communication system and in this state, the sound of an emergency alert is overlapped on the sound of the calls, the sound of the emergency alert may be difficult to comprehend. In such a case, according to the structure disclosed, the communications in other communication channels are stopped when the emergency alert is broadcasted, so that the emergency alert can reliably be reported to the user of each terminal.

Another aspect of the present invention is a center module in a wireless communication system including the center module and a plurality of terminals, a plurality of the terminals making a wireless communication with each other via the center module. In this method, at least some terminals out of a plurality of the terminals have an emergency alert function, while at least some terminals out of a plurality of the terminals have a connection request function. The center module includes: a broadcast communication section for, in response to reception of an emergency alert signal from the terminal having the emergency alert function, broadcasting the emergency alert from the terminal which transmitted the emergency alert signal to other terminals; and a communication control section for, in response to reception of a connection request signal from the terminal having the connection request function, transmitting a communication control signal to put the terminal which transmitted the emergency alert in a communicable state, and the broadcast communication section transmits, after the terminal which transmitted the emergency alert is in the communicable state in response to reception of the communication control signal, a sound from the terminal which transmitted the emergency alert to the terminals other than the terminal which transmitted the emergency alert.

Also in this structure, an emergency alert is broadcasted by the terminal having the emergency alert function. To acquire further information from the emergency alert sender in a terminal having the connection request function after the broadcasting of the emergency alert, a connection request signal is transmitted from the terminal having the connection request function so that the terminal of the emergency alert sender is automatically put in a communicable state. Consequently, even when another user, who hopes to acquire further information after termination of transmission of the emergency alert, does not know who the emergency alert sender is, a communication with the terminal of the emergency alert sender can be established only by transmitting the connection request signal from the terminal of the another user having the connection request function. Moreover, once the connection request signal is transmitted, a communication is automatically initiated in the terminal of the emergency alert sender, and therefore even when the emergency alert sender is in the situation where operation to initiate a communication with other terminals is impossible, the emergency alert sender can perform a communication with other terminals after termination of transmission of the emergency alert.

In the above-mentioned center module, after the terminal which transmitted the emergency alert is in the communicable state in response to reception of a communication control signal, the sound from the terminal which transmitted the emergency alert may be transmitted only to the terminal which transmitted the connection request signal.

According to the structure, a mutual one-on-one communication may be performed between the terminal which transmitted the connection request signal and the terminal which transmitted the emergency alert, so that the emergency alert sender can provide the connection requester with a report including confidential matters unsuitable to be heard by other users.

In the above-mentioned center module, after the terminal which transmitted the emergency alert is in the communicable state in response to reception of the communication control signal, the sound from the terminal which transmitted the emergency alert may be broadcasted to a plurality of the terminals.

According to the structure, details of the situation regarding the emergency can simultaneously be reported from the terminal of the emergency alert sender to a plurality of other terminals.

Still another aspect of the present invention is a wireless communication method in a wireless communication system including a center module and a plurality of terminals, a plurality of the terminals making a wireless communication with each other via the center module. In this method, at least some terminals out of a plurality of the terminals have an emergency alert function, while at least some terminals out of a plurality of the terminals have a connection request function. The wireless communication method includes: an emergency alert transmission step of, in the terminal having the emergency alert function, transmitting to the center module an emergency alert signal for broadcasting an emergency alert; a broadcast communication step of, in the center module, broadcasting the emergency alert to the terminals other than the terminal which transmitted the emergency alert signal; an emergency alert termination step of, in the center module, terminating broadcasting of the emergency alert; a connection request transmission step of, in the terminal having the connection request function, transmitting a connection request signal to the terminal which transmitted the emergency alert; a communication control step of, in the center module, transmitting a communication control signal, in response to reception of the connection request signal, to put the terminal which transmitted the emergency alert in a communicable state; and an automatic communication initiation step of, in the terminal which transmitted the emergency alert at the emergency alert transmission step, automatically allowing a communication with the terminal which transmitted the connection request signal in response to reception of the communication control signal transmitted at the communication control step.

Also in this structure, an emergency alert is broadcasted by the terminal having the emergency alert function. To acquire further information from the emergency alert sender in a terminal having the connection request function after the broadcasting of the emergency alert, a connection request signal is transmitted from the terminal having the connection request function so that the terminal of the emergency alert sender is automatically put in a communicable state. Consequently, even when another user, who hopes to acquire further information after termination of transmission of the emergency alert, does not know who the emergency alert sender is, a communication with the terminal of the emergency alert sender can be established only by transmitting the connection request signal from the terminal of the another user having the connection request function. Moreover, once the connection request signal is transmitted, a communication is automatically initiated in the terminal of the emergency alert sender, and therefore even when the emergency alert sender is in the situation where operation to initiate a communication with other terminals is impossible, the emergency alert sender can perform a communication with other terminals after termination of transmission of the emergency alert.

Still another aspect of the present invention is a method for relaying a wireless communication in a center module in a wireless communication system including the center module and a plurality of terminals, a plurality of the terminals making a wireless communication with each other via the center module. In this method, at least some terminals out of a plurality of the terminals have an emergency alert function, while at least some terminals out of a plurality of the terminals have a connection request function. The method for relaying a wireless communication includes: a broadcast communication step of, in response to reception of an emergency alert signal from the terminal having the emergency alert function, broadcasting the emergency alert to the terminals other than the terminal which transmitted the emergency alert signal; an emergency alert termination step of terminating broadcasting of the emergency alert; a communication control step of, in response to reception of a connection request signal from the terminal having the connection request function, transmitting a communication control signal to put the terminal which transmitted the emergency alert in a communicable state; and a relaying step of transmitting, after the terminal which transmitted the emergency alert is in the communicable state in response to reception of the communication control signal, a sound from the terminal which transmitted the emergency alert to the terminals other than the terminal which transmitted the emergency alert.

Also in this structure, an emergency alert is broadcasted by the terminal having the emergency alert function. To acquire further information from the emergency alert sender in a terminal having the connection request function after the broadcasting of the emergency alert, a connection request signal is transmitted from the terminal having the connection request function so that the terminal of the emergency alert sender is automatically put in a communicable state. Consequently, even when another user, who hopes to acquire further information after termination of transmission of the emergency alert, does not know who the emergency alert sender is, a communication with the terminal of the emergency alert sender can be established only by transmitting the connection request signal from the terminal of the another user having the connection request function. Moreover, once the connection request signal is transmitted, a communication is automatically initiated in the terminal of the emergency alert sender, and therefore even when the emergency alert sender is in the situation where operation to initiate a communication with other terminals is impossible, the emergency alert sender can perform a communication with other terminals after termination of transmission of the emergency alert.

Still another aspect of the present invention is a program for executing a method for relaying a wireless communication, the program being executed by a center module.

Still another aspect of the present invention is a wireless communication method in a wireless communication system including a wireless communication center module and a plurality of terminals, a plurality of the terminals making a wireless communication with each other via the wireless communication center module. In this method, a plurality of the terminals include a first terminal having a dedicated communication channel and a second terminal having a plurality of communication channels different from the dedicated communication channel. The wireless communication method includes: a first step of, in one of the second terminals, performing broadcast communication to other terminals by specified operation and transmitting an ID signal of the one of the second terminals to the wireless communication center module; a second step of, in the first terminal, requesting connection to the second terminal which performed the broadcast communication from the wireless communication center module; and a third step of, in the wireless communication center module, allowing a communication between the one of the first terminals and the second terminal which performed the broadcast communication based on the received ID signal of the second terminal.

In the wireless communication method disclosed above, one of a plurality of the communication channels other than the communication channel dedicated to the first radio terminal may preferentially be used for the communication between the first radio terminal and the one of the second radio terminals at the third step.

In the wireless communication method disclosed above, the communication channel dedicated to the first terminal may be used for the communication between the first terminal and the one of the second terminals at the third step.

Still another aspect of the present invention is a wireless communication system including a wireless communication center module and a plurality of terminals, a plurality of the terminals making a wireless communication with each other via the wireless communication center module with use of a plurality of communication channels. In this system, a plurality of the terminals include a first terminal having a dedicated communication channel and a second terminal having a plurality of communication channels different from the dedicated communication channel. In the wireless communication system, the second terminal performs broadcast communication to other terminals by specified operation and transmits an ID signal of the one of the second terminals to the wireless communication center module, and when the first terminal requests connection to the second terminal after the second terminal performs the broadcast communication, the wireless communication center module allows a communication between the first terminal and the second terminal which performed the broadcast communication based on the received ID signal of the second terminal.

In the above wireless communication system, one of a plurality of the communication channels other than the communication channel dedicated to the first terminal is preferentially used for the communication between the first terminal and the one of the second terminals.

In the above wireless communication system, the communication channel dedicated to the first terminal may be used for the communication between the first terminal and one of the second terminal.

The embodiments of the present invention will be described below with reference to the accompanying drawings. Although a description will be given below by taking as an example the case where the wireless communication system of the present invention is used in restaurants, more particularly in quick service restaurants having drive-thru facility, the wireless communication system of the present invention may be applied to other situations such as amusement facilities and disaster relief sites other than the restaurants.

Overall Structure

Figure 2:
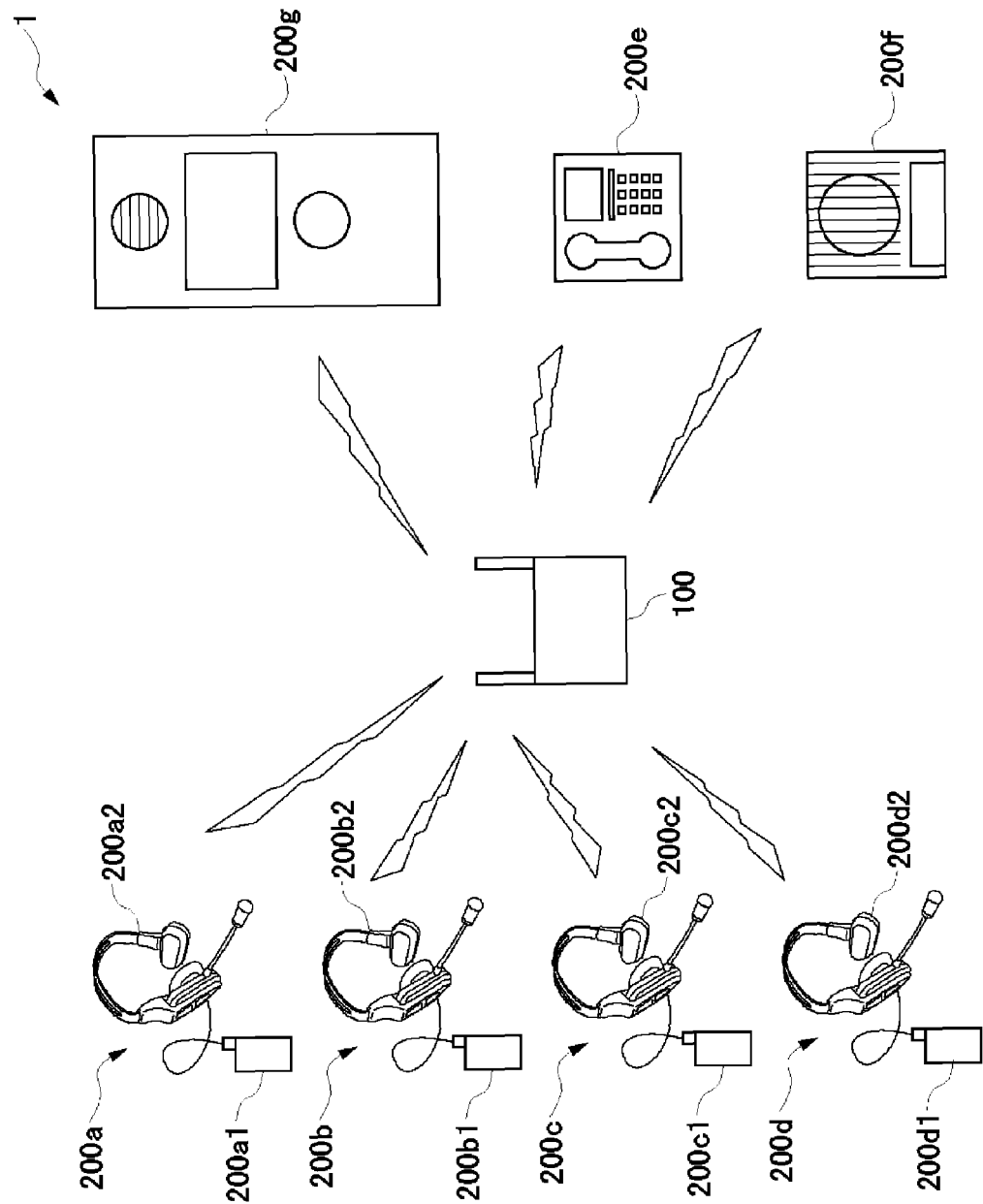
FIG. 2 is a block diagram showing a wireless communication system in an embodiment of the present invention.

A description will now be given of the overall structure of a wireless communication system in a first embodiment of the present invention. FIG. 2 is a block diagram showing the wireless communication system in an embodiment of the present invention. A wireless communication system 1 is structured to include a center module 100 and a plurality of terminals 200a-200g. The center module 100 and each of the terminals 200a-200g transmit and receive a sound signal and various signals by radio. The wireless communication between each of the terminals 200a-200g is performed via the center module 100. The center module 100 is placed at a position where wireless radio waves reach from the terminals 200a-200g placed inside the store. The center module 100 may be placed, for example, near an order counter of the quick service restaurant.

Four terminals 200a-200d shown on the left-hand side of FIG. 2 are intercoms composed of terminal main bodies 200a1-200d1 and headsets 200a2-200d2. The terminal main bodies 200a1-200d1 are each held in a holder and attached to a user's waist. The headsets 200a2-200d2 are structured to be mountable on the head of the user and include an earphone and a microphone. The terminal 200a is for manager, a terminal 200b is for sub-manager, a terminal 200c is for store personnel 1, and a terminal 200d is for store personnel 2.

The terminal 200e is for telephone. The telephone terminal 200e is connected to a telephone set. The telephone terminal 200e inputs a sound received from another terminal into a telephone set to transmit the sound to the person at the other end of the telephone line. The telephone terminal 200e extracts a sound in the telephone set received from the person at the other end of the telephone line and sends the sound to other terminals. It is to be noted that the telephone terminal 200e may be incorporated in the telephone set.

The terminal 200f is for kitchen. Unlike the terminals 200a-200d for other staff members, the terminal 200f is placed at an appropriate spot in the kitchen. This is because it is not preferable for kitchen staff to wear the headset from a hygiene point of view. The terminal 200f may be structured to include a speaker and a microphone and may be structured to include a speaker but not a microphone (sound output only).

The terminal 200g is a menu board of drive-thru. The menu board 200g, which is a part of a drive-thru system, is placed at a drive-thru reception (order taking) position outside the store so that the terminal is available for drive-thru customers. In the description of the present embodiment, the drive-thru system is structured to include a confirmation order display, a camera, a vehicle sensor and the like.

Terminal Structure

Hereinafter, a description will be given of the structure of each of the terminals 200a-200g with reference to FIGS. 3-6. In the following description, like component members are designated by like reference signs to adequately omit a redundant description.

Figure 3:
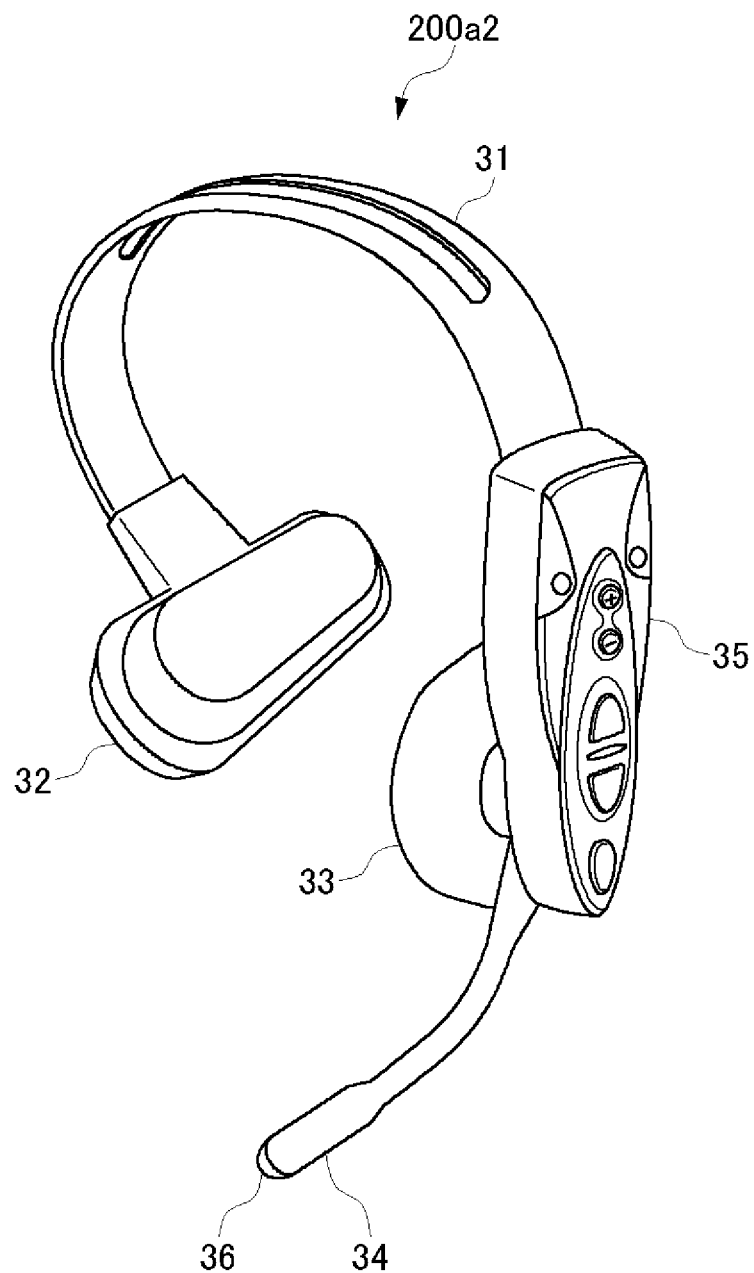
FIG. 3 is an external view showing a headset of a terminal in an embodiment of the present invention.

FIG. 3 is an external view showing the headset of the terminal in an embodiment of the present invention. The headsets of the manager terminal 200a, the sub-manager terminal 200b, the store personnel 1 terminal 200c, and the store personnel 2 terminal 200d share the same structure. Hereinafter, the structure of the headset 200a2 of the manager terminal 200a will be described as a representative headset of these terminals.

The headset 200a2 is used to be mounted on the head. The headset 200a2 includes a holder band 31, a holder pad 32, an earphone 33, a microphone 34, an operation section 35, and a lamp 36.

The holder band 31 is a flexible member curved to form a shape smaller than the shape of the general human head so as to be placed over the head in the horizontal direction. The holder pad 32 is provided at one end of the holder band 31 and comes into contact with a portion of the head above the ear when the headset is mounted on the head. The operation section 35 is provided at the other end of the holder band 31. The earphone 33 and the microphone 34 are provided at the top end of the operation section 35. The microphone 34 is in an elongated shape so that the top end thereof comes closer to the mouth of the wearer of the headset when the headset is mounted on the head, and the microphone 34 is also deformable. The lamp 36 is provided at the top end of the microphone 34.

FIG. 4 is an enlarged view showing the operation section of the headset in an embodiment of the present invention. Various kinds of buttons are provided on the operation section 35. More specifically, the operation section 35 of the headset 200a2 includes a page mode communication button 351, a lane change button 352, a talk mode communication button 353, a volume-down button 354, a volume-up button 355, a receive button 356, and an emergency alert button 357.

The page mode communication button 351 is a button for turning on and off the communication in the page mode. The lane change button 352 is a button for changing the lanes upon pressing when the wireless communication system includes a plurality of systems (lanes). The talk mode communication button 353 is a button for turning on and off the communication in the talk mode. Pressing the volume-down button 354 lowers the volume of the earphone, while pressing the volume-up button 355 increases the volume the earphone. Pressing the receive button 356 makes it possible to answer an incoming outside telephone call. Pressing the emergency alert button 357 transmits a later-described emergency alert signal to the center module.

FIG. 5 is a view showing the structure of the manager terminal and the like in an embodiment of the present invention. It is to be noted that the sub-manager terminal 200b, the store personnel 1 terminal 200c, and the store personnel 2 terminal 200d also share the same structure. The manager terminal 200a includes a transmission/reception section 51, an operation section 52, a notification section 53, a control section 54, a detection section 55, a storage section 56, a sound output section 57, and a sound input section 58.

The transmission/reception section 51 performs transmission and reception of a sound signal and various kinds of control signals to/from the center module 100. In particular, the transmission/reception section 51 transmits a later-described emergency alert signal, a connection request signal, a response signal and a speaker control signal to the center module 100, and receives a later-described communication control signal and an emergency alert notification signal transmitted from the center module 100. The operation section 52 corresponds to the operation section 35 of the headset 200a2 described in FIG. 3 and FIG. 4. The notification section 53, which corresponds to the lamp 36 of the headset 200a2 described in FIG. 3, appeals to the visual sense of the user by light emission to provide notification. The notification section 53 may appeal to the auditory sense of the user by outputting a notification sound from the sound output section 57, and may also be a vibrator for appealing the tactile sense of the user. The notification section 53 corresponds to the "emergency alert notification section" of the present invention.

The detection section 55 detects a signal received in the transmission/reception section 51. As described above, the transmission/reception section 51 receives not only the sound signal but also various kinds of control signals including, for example, a later-described communication control signal and an emergency alert notification signal, and these signals are detected in the detection section 55. The storage section 56 stores its own terminal ID. Terminal IDs assigned to the respective terminals 200a-200g are different from each other.

The sound output section 57, which corresponds to the earphone 33 of the headset 200a2 described in FIG. 3, outputs a sound signal received in the transmission/reception section 51 as a sound. The sound input section 58, which corresponds to the microphone 34 of the headset 200a2 described in FIG. 3, converts a sound wave (user's voice) into a sound signal. The control section 54 performs various kinds of control on each of the above sections. The operation of the manager terminal 200a under the control of the control section 54 will be described later.

Figure 6:
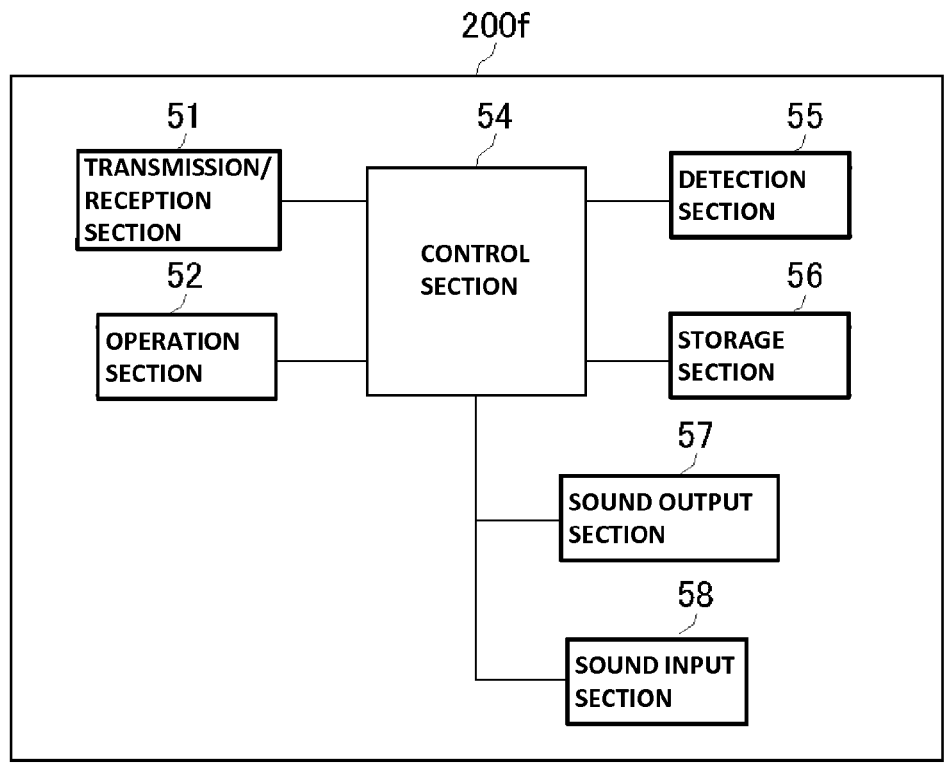
FIG. 6 is a view showing the structure of a kitchen terminal and the like in an embodiment of the present invention.

FIG. 6 is a view showing the structure of a kitchen terminal and the like in an embodiment of the present invention. The kitchen terminal 200f has the same structure as the manager terminal 200a except for the point that the notification section is not included. More specifically, the kitchen terminal 200f includes a transmission/reception section 51, an operation section 52, a control section 54, a detection section 55, a storage section 56, a sound output section 57, and a sound input section 58. The operation section 52 has buttons corresponding to the page mode communication button 351, the lane change button 352, the talk mode communication button 353, the volume-down button 354, the volume-up button 355, the receive button 356, and the emergency alert button 357 described in FIG. 4. The sound output section 57 is a speaker.

The telephone terminal 200e shown in FIG. 2 has the same structure as the structure of the kitchen terminal 200f shown in FIG. 6. The sound output section 57 of the telephone terminal 200e is for outputting a sound signal to the telephone line and the sound input section 58 is for inputting a sound signal from the telephone line. The operation section 52 has the volume-down button 354, the volume-up button 355, the receive button 356, and other buttons required as a telephone set, though the operation section 52 does not have the page mode communication button 351, the lane change button 352, the talk mode communication button 353 and the emergency alert button 357.

The menu board 200g shown in FIG. 2 has the same structure as the structure of the kitchen terminal 200f shown in FIG. 6. The sound output section 57 of the menu board 200g is a speaker for outputting a sound toward drive-thru customers, and the sound input section 58 is a microphone for converting a voice of drive-thru customers into a sound signal. The operation section 52 has the volume-down button 354, the volume-up button 355, and other buttons required to input various kinds of setting as a menu board, though the operation section 52 does not have the page mode communication button 351, the lane change button 352, the talk mode communication button 353, the receive button 356 and the emergency alert button 357.

Center Module Structure

Figure 7:
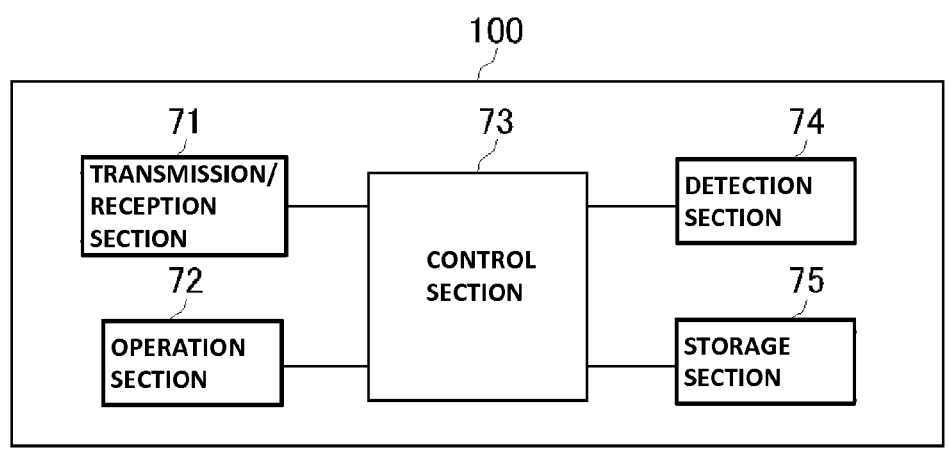
FIG. 7 is a view showing the structure of a center module in an embodiment of the present invention.

FIG. 7 is a view showing the structure of a center module in an embodiment of the present invention. The center module 100 includes a transmission/reception section 71, an operation section 72, a control section 73, a detection section 74, and a storage section 75. The transmission/reception section 71 performs transmission and reception of a sound signal and various kinds of control signals to/from respective terminals. The transmission/reception section 71, during the communication in the page mode and the talk mode in particular, transmits a sound signal transmitted from a terminal on the transmission side to a terminal on the reception side. At the time of transmission of emergency alert, the transmission/reception section 71 receives signals such as a later-described emergency alert signal, a connection request signal, a response signal and a speaker control signal from terminals, and transmits signals such as a later-described warning sound signal, a communication control signal, and an emergency alert notification signal to a specific terminal.

In FIG. 7, the operation section 72 is embodied by buttons and switches used for inputting various kinds of setting. The detection section 74 detects a signal received in the transmission/reception section 71. As described above, the transmission/reception section 71 receives not only a sound signal but also various kinds of control signals including, for example, a later-described emergency alert signal, a connection request signal, a response signal and a speaker control signal, and these signals are detected in the detection section 74. The storage section 75 stores sound routing tables shown in FIGS. 8-10 and a later-described warning sound signal, and also stores if necessary the terminal ID of a terminal which transmits an emergency alert and the terminal ID of a terminal which transmits a connection request. The control section 73 performs various kinds of control on each of the above sections. The operation of the center module 100 under the control of the control section 73 will be described later.

Hereinafter, a description will be given of the operation of the terminals 200a-200g and the center module 100 in FIG. 2. The operation of the terminals 200a-200g is implemented when the control section 54 shown in FIG. 5 controls each of the sections according to a specified program in response to the signals from each of the sections. The operation of the center module 100 shown in FIG. 7 is implemented when the control section 73 controls each of the sections according to a specified program in response to the signals from each of the sections. Hereinafter, a description will be given of the operation when a communication is performed in the talk mode and the page mode and then a description will be given of the operation of transmission of emergency alert. As shown before, the talk mode and the page mode are different only in a sound being outputted or not outputted from the sound output section 57 of the menu board 200g. Therefore, in order to distinguish the talk mode and the page mode from a later-described "emergency alert", both the modes are collectively referred to as "normal mode".

Normal Mode

In the normal mode, a talk communication is enabled after a transmission trigger is generated. With reference to FIG. 2 and FIG. 5, the generation of talk communication trigger refers to turning on the page mode communication button 351 or the talk mode communication button 353 in the manager terminal 200a, the sub-manager terminal 200b, the store personnel 1 terminal 200c, the store personnel 2 terminal 200d, and the kitchen terminal 200f. In the telephone terminal 200e, the generation of talk communication trigger refers to receiving an incoming outside telephone call, and in the menu board 200g, it refers to receiving a signal indicating detection of a vehicle from the vehicle sensor in the drive-thru system.

Further in the manager terminal 200a, the sub-manager terminal 200b, the store personnel 1 terminal 200c, the store personnel 2 terminal 200d, and the kitchen terminal 200f, the page mode communication button 351 and the talk mode communication button 353 may be structured to be kept in ON state while the user presses the button by hand and to be turned off when the user puts his/her hand off, or be structured to be kept in ON state once the user operates the button and to maintain the ON state until the user operates to turn the button off.

The page mode communication button 351 and the talk mode communication button 353 output a signal indicating ON state to the control section 54. The control section 54 performs control for talk communication when either the page mode communication button 351 or the talk mode communication button 353 is ON. More specifically, when either the page mode communication button 351 or the talk mode communication button 353 is ON, the control section 54 receives input of a sound signal outputted from the sound input section 58, and transmits the sound signal to the center module 100 through the transmission/reception section 51. The sound signal has a control signal added thereto, the control signal including the status of the communication mode (page mode or talk mode), the type of the lane, and information on the terminal ID stored in the storage section 56.

In the center module 100, the sound signal and the control signal are received in the transmission/reception section 71 and are outputted to the control section 73. The control section 73 specifies the terminal which transmitted the sound signal based on the terminal ID included in the control signal, and transmits the received sound signal to other terminals according to the sound routing table stored in the storage section 75.

FIG. 8 is a view showing the sound routing table in the talk mode in an embodiment of the invention, and FIG. 9 is a view showing the sound routing table in the page mode in an embodiment of the invention. The sound routing table defines which terminal on the transmission side can perform talk communication to which terminal on the reception side. The definition regarding which terminal on the transmission side can perform talk communication to which terminal on the reception side depends on the attributes of the terminals on the transmission side and on the reception side. That is, the center module 100 manages the definition regarding which terminal on the transmission side can perform talk communication to which terminal on the reception side depending on the attributes of the terminals. The attribute of a terminal is determined based on the terminal ID of the terminal on the transmission side included in the control signal.

With reference to FIGS. 8 and 9, a symbol "O" indicates that the center module preferentially transmits the sound signal transmitted from the transmission-side terminal to the reception-side terminal, a symbol "X" indicates that the center module does not transmit the sound signal transmitted from the transmission-side terminal to the reception-side terminal, a symbol "–" indicates that its own sound signal is not outputted or the reception-side terminal does not have a sound output function (i.e., the sound signal transmitted from the transmission-side terminal is not outputted in the reception-side terminal), and a symbol "O/X" indicates that transmission is possible though the communication may be disconnected to vacate a communication channel to other communications when the other communications are initiated later.

As shown in FIG. 8, in the talk mode with the talk mode communication button 353 in ON state, the sound signals transmitted from the manager terminal 200a (MG), the sub-manager terminal 200b (SMG), the store personnel 1 terminal 200c (CL1) and the store personnel 2 terminal 200d (CL2) are transmitted to the telephone terminal 200e (TEL) and the kitchen terminal 200f (KTN). The sound signal transmitted in the state of receiving an incoming outside telephone call in the telephone terminal 200e (TEL) is transmitted to the terminals other than the telephone terminal 200e (TEL) and the menu board 200g (DRT).

The sound signal transmitted from the kitchen terminal 200f (KTN) with the talk mode communication button 353 in ON state is transmitted to the telephone terminal 200e (TEL). The sound signal transmitted from the menu board 200g (DRT) upon detection of a vehicle by the vehicle sensor is transmitted to the terminals other than the kitchen terminal 200f (KTN) and the menu board 200g (DRT).

As shown in FIG. 9, in the page mode, the sound signal transmitted from the manager terminal 200a (MG) is transmitted to the sub-manager terminal 200b (SMG), the store personnel 1 terminal 200c (CL1), the store personnel 2 terminal (CL2), and the kitchen terminal 200f (KTN). The sound signal transmitted from the sub-manager terminal 200b (SMG) is transmitted to the manager terminal 200a (MG), the store personnel 1 terminal 200c (CL1), the store personnel 2 terminal (CL2), and the kitchen terminal 200f (KTN). Since the manager terminal 200a and the sub-manager terminal 200b are terminals with manager setting, the sound signal from these units is transmitted through a communication channel preferentially reserved therefor.

In the page mode, the sound signals transmitted from the store personnel 1 terminal 200c (CL1) and the store personnel 2 terminal 200d (CL2) are outputted to the telephone terminal 200e (TEL) and the kitchen terminal 200f (KTN). When an incoming outside telephone call is received, the sound signal transmitted from the telephone terminal 200e (TEL) is transmitted to the store personnel 1 terminal 200c (CL1), the store personnel 2 terminal 200d (CL2), and the kitchen terminal 200f (KTN). However, these communications may be disconnected upon usage of their communication channels by other communications as described above. More specifically, in the page mode, specific terminals have a communication channel preferentially assigned thereto, whereas other terminals do not have such a communication channel preferentially assigned thereto in the present embodiment.

Further, in the kitchen terminal 200f (KTN), talk communication with the page mode communication button 351 in ON state allows the sound signal to be transmitted to the store personnel 1 terminal 200c (CL1), the store personnel 2 terminal 200d (CL2), and the telephone terminal 200e (TEL). Moreover, upon detection of a vehicle with the vehicle sensor in the drive-thru system, the sound signal transmitted from the menu board 200g (DRT) is transmitted to the store personnel 1 terminal 200c (CL1), the store personnel 2 terminal 200d (CL2), and the kitchen terminal 200f (KTN). It is to be noted that these communications may also be disconnected by use of their communication channels by other communications as described above.

As mentioned above, in the wireless communication system 1 of the present embodiment, the center module 100 selects a sound routing table in response to the communication mode, and according to the selected sound routing table, the center module 100 determines which terminal transmits a sound signal depending on the attributes of the terminals.

Based on the terminal ID included in a control signal and with reference to the attributes of the terminals stored in the storage section 75, the control section 73 shown in FIG. 7 determines whether or not the terminal, which transmits the sound signal and the control signal, is a terminal with general setting or a terminal with manager setting, and in accordance with the determination result, the control section 73 transmits and receives the signal by using either one of the four communication channels (four kinds of frequency) for use in the wireless communication system 1. More specifically, when the terminal which transmits the sound signal and the control signal is a terminal with manager setting, the control section 73 transmits and receives the signal by using a communication channel, out of the four channels, which is reserved for the manager. In the case where the terminal which transmits the sound signal is a terminal with manager setting but the communication channel dedicated to the manager is already occupied, either one of the remaining three communication channels is used.

When the terminal which transmits the sound signal and the control signal is a terminal with general setting, the control section 73 transmits and receives the signal by using any one of available communication channels out of the three communication channels assigned to the terminals with general setting among the four communication channels. When all the three communication channels assigned to the terminals with general setting are already used, the terminal which initiated a communication the earliest among other units is disconnected from the communication to vacate one communication channel so that the latest communication can use it.

Emergency Alert

A description will now be given of the operation of the terminals 200a-200g and the center module 100 in the case of transmission of emergency alert. A description will first be given of the first embodiment. The emergency alert of the first embodiment may have various technologies added thereto and may also be modified. Hereinafter, technology-added examples and modified examples are described as other embodiments.

First Embodiment

Transmission of emergency alert is started by emergency alert operation, i.e., by pressing of the emergency alert button 357, in the terminal including the emergency alert button 357 and the emergency alert function (the manager terminal 200a, the sub-manager terminal 200b, the store personnel 1 terminal 200c, the store personnel 2 terminal 200d, and the kitchen terminal 200f).

Figures 10, 11:
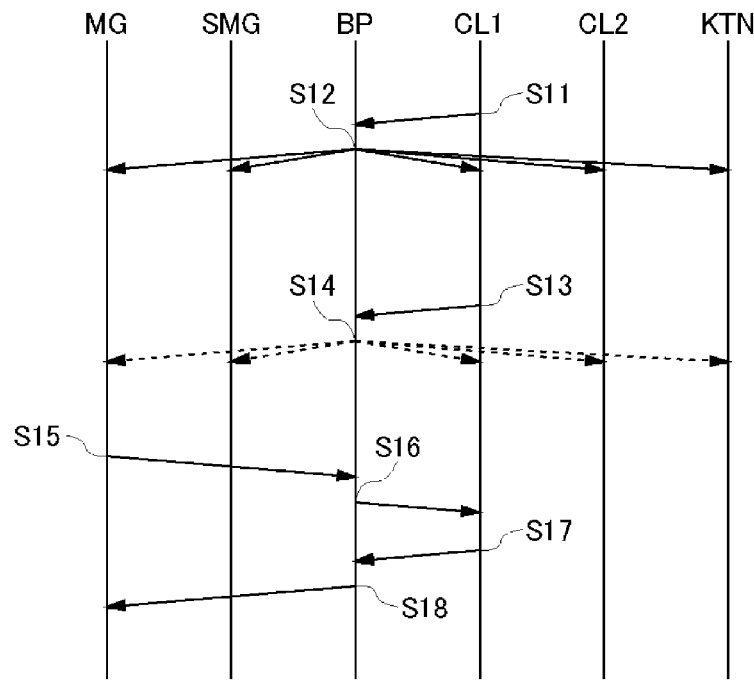
FIG. 10 is a view showing the structure of a wireless communication system for explaining operation of emergency alert transmission in the first embodiment of the present invention.
FIG. 11 is a view showing a sound routing table for emergency alert transmission in an embodiment of the present invention.

FIG. 10 is a view showing operation of transmission of emergency alert in the first embodiment of the present invention. FIG. 10 shows the case where the store personnel 1 terminal 200c (second wireless communication terminal) transmits an emergency alert as an example. When the emergency alert button 357 is pressed (emergency alert operation) in the store personnel 1 terminal 200c that is a terminal having the emergency alert function, the control section 54 transmits an emergency alert signal to the center module 100 through the transmission/reception section 51 with reference to FIG. 5 (Step S11). In this case, the terminal which transmits an emergency alert (hereinafter referred to as "emergency alert terminal") transmits its own terminal ID together with the emergency alert signal to the center module 100 from the transmission/reception section 51. The structure for transmitting the emergency alert signal in the emergency alert terminal corresponds to the "emergency alert section" of the present invention.

With reference to FIG. 7, the center module 100 receives the emergency alert signal in the transmission/reception section 71, and the transmission/reception section 71 outputs the received signal to the control section 73. Upon reception of the emergency alert signal in the detection section 74, the control section 73 broadcasts a sound signal that is a beep sound as a warning sound stored in the storage section 75 to corresponding terminals according to the sound routing table for emergency alert stored in the storage section 75 (Step S12). In order to satisfy subsequent connection requests, the terminal ID of the emergency alert terminal is stored in the storage section 75. The structure for broadcasting in the center module 100 corresponds to the "broadcast communication section" of the present invention.

In the broadcasting of the emergency alert, the center module 100 broadcasts the emergency alert by preferentially using one of three communication channels assigned to the terminals with general setting. More specifically, when all of the three communication channels are occupied by other terminals with general setting, the communication initiated the earliest is forcedly terminated and the resultant vacant communication channel is assigned to the broadcasting of the emergency alert. In the case where calls by other terminals with general setting are made during the broadcasting of the emergency alert, the communication channel used for the emergency alert is not intercepted but continues to be used for the broadcasting of the emergency alert.

FIG. 11 is a view showing a sound routing table for transmission of emergency alert in the embodiment of the present invention. Also in FIG. 11, as in the case of FIG. 8 and FIG. 9, a symbol "O" indicates that the center module preferentially transmits a sound signal transmitted from the transmission-side terminal to the reception-side terminal, a symbol "X" indicates that the center module does not transmit a sound signal transmitted from the transmission-side terminal to the reception-side terminal, and a symbol "–" indicates that its own sound signal is not outputted or the reception-side terminal does not have a sound output function (i.e., the sound signal transmitted from the transmission-side terminal is not outputted in the reception-side terminal).

As shown in FIG. 10, an emergency alert can be transmitted from the manager terminal 200a, the sub-manager terminal 200b, the store personnel 1 terminal 200c, the store personnel 2 terminal 200d, and the kitchen terminal 200f having the emergency alert function. The emergency alert is to be received by the above terminals having the emergency alert function other than the emergency alert terminal. As described later, the emergency alert may also be transmitted from the center module 100 to an in-store speaker connected to the center module 100 by wire or wireless and be outputted from the in-store speaker.

Back in FIG. 10, the center module 100 which received the emergency alert signal at step S12 continues the broadcasting of the emergency alert (transmission of a warning sound signal). In the terminal which received the warning sound signal, the warning sound is outputted from the sound output section 57. If the emergency alert sender (the store personnel 1 in the example of FIG. 10) presses the emergency alert button 357 again (emergency alert termination operation) while the emergency alert is continuing, i.e., while the warning sound signal is being continuously transmitted from the center module 100, an emergency alert termination signal is transmitted from the store personnel 1 terminal 200c that is an emergency alert terminal to the center module 100 (step S13), and thereby the broadcasting of the warning sound signal is terminated (step S14). Thus, when the emergency becomes under control, the store personnel 1 can press the emergency alert button 357 to terminate the broadcasting performed by the center module 100.

In the operation up to this point, other staff members who received the emergency alert can know that an emergency occurred somewhere. However, after the termination of transmission of the emergency alert, the other staff members cannot find out whether or not the emergency is under control or how the emergency is turned out. To cope with this problem, the other staff members can make a connection request after the termination of transmission of the emergency alert. More specifically, the connection request can be made by pressing the page mode communication button 351 and the emergency alert button 357 simultaneously for a longer time (for 2 seconds for example) (connection request operation) in the terminals other than the emergency alert terminal (the terminal which makes a connection request is hereinafter referred to as "connection request terminal"). The structure for making the connection request in the terminal corresponds to the "connection request section" of the present invention.

FIG. 10 also shows an example in which the manager terminal 200a (first wireless communication terminal) makes a connection request. When connection request operation is performed in the connection request terminal that is a manager terminal having the connection request function, the control section 54 controls the transmission/reception section 51 to transmit a connection request signal to the center module 100 (step S15).

Upon reception of the connection request signal in the transmission/reception section 71, the center module 100 specifies the emergency alert terminal by referring to the terminal ID of the emergency alert terminal stored in the storage section 75, and controls the transmission/reception section 71 to transmit a communication control signal to the identified emergency alert terminal (the store personnel 1 terminal 200c in the example of FIG. 10) (step S16). The communication control signal is a signal for controlling the emergency alert terminal so that the sound signal from the emergency alert terminal is transmitted to the connection request terminal (the manager terminal 200a in the example of FIG. 10). The structure for transmitting the communication control signal in the center module 100 corresponds to the "emergency alert section" of the present invention.

Upon reception of the communication control signal in the transmission/reception section 51, the store personnel 1 terminal 200c that is an emergency alert terminal transmits a sound signal generated in the sound input section 58 to the center module 100 via the transmission/reception section 51 under the control of the control section 54 (step S17), and the center module 100 then transmits the sound signal to the manager terminal 200a that is a connection request terminal (step S18). The above structure for initiating a communication in response to reception of the communication control signal in the terminal corresponds to the "automatic communication initiation section" of the present invention. In the manager terminal 200a, the automatic communication initiation section 212 is operated upon reception of the communication control signal in the transmission/reception section 51. Thus, the store personnel 1 terminal 200c and the manager terminal 200a are put in a communicable state. The communicable state refers to the state in which voice transmission and reception is enabled. Although the communication is performed in the mode for preferentially using communication channels other than the dedicated communication channel, it may be switched to the mode for using the dedicated communication channel upon device operation by the user. The dedicated communication channel for a terminal is a communication channel that can be use only by the terminal and cannot be used by the other terminal.

FIG. 1 is a view showing the structure of the wireless communication system for explaining operation of transmission of emergency alert in the first embodiment of the present invention. Only the structural aspects relating to the present embodiment are shown in FIG. 1.

When the user performs emergency alert operation in an emergency alert terminal 210, an emergency alert section 211, in response to the operation, transmits an emergency alert signal to the center module 100. When the center module 100 receives the emergency alert signal, a broadcast communication section 110, in response to the reception of the signal, broadcasts a warning sound to the terminals other than the emergency alert terminal. When the user performs emergency alert termination operation in the emergency alert terminal 210, the emergency alert section 211, in response to the operation, transmits an emergency alert termination signal to the center module 100. When the center module 100 receives the emergency alert termination signal, the broadcast communication section 110, in response to the reception of the signal, terminates the broadcasting of the warning sound.

When connection request operation is performed in a connection request terminal 220, a connection request section 221, in response to the operation, transmits a connection request signal to the center module 100. When the connection request signal is received in the center module 100, a communication control section 120 transmits, in response to the reception of the signal, a communication control signal to the emergency alert terminal 210. When the communication control signal is received in the emergency alert terminal 210, the automatic communication initiation section 212, in response to the reception of the signal, initiates a mutual one-on-one communication with the connection request terminal 220.

Thus, in the wireless communication system 1 of the present embodiment, the emergency alert terminal transmits its own terminal ID with an emergency alert signal to the center module 100, and the center module 100 stores the terminal ID of this emergency alert terminal so that after termination of transmission of the emergency alert, in response to the connection request from another terminal, a communication control signal can be transmitted to the emergency alert terminal to initiate a communication between the emergency alert terminal and the connection request terminal. In this case, even when the connection request terminal does not recognize which terminal is the emergency alert terminal, a call with the emergency alert terminal can be made automatically (through operation of the center module) only by performing the connection request operation. Moreover, even in the case where after an emergency occurred and an emergency alert was transmitted, the emergency alert is terminated by operation error and another emergency alert cannot be transmitted (because of being panicked and the like) in the emergency alert terminal, a call with the connection request terminal is initiated automatically (through operation of the connection request terminal and the center module), so that communication with the connection request terminal can be made with respect to the emergency which is not yet under control.

Although the store personnel 1 that is an emergency alert sender performs the emergency alert termination operation to terminate the emergency alert transmission in the above description, the broadcasting of the emergency alert may automatically be terminated when emergency alert [firing] termination operation is not performed for a fixed period of time (3 minutes for example), or the broadcasting of the emergency alert may be continued until the emergency alert termination operation is performed (i.e., until the center module 100 receives an emergency alert termination signal).

Second Embodiment

Figure 12:
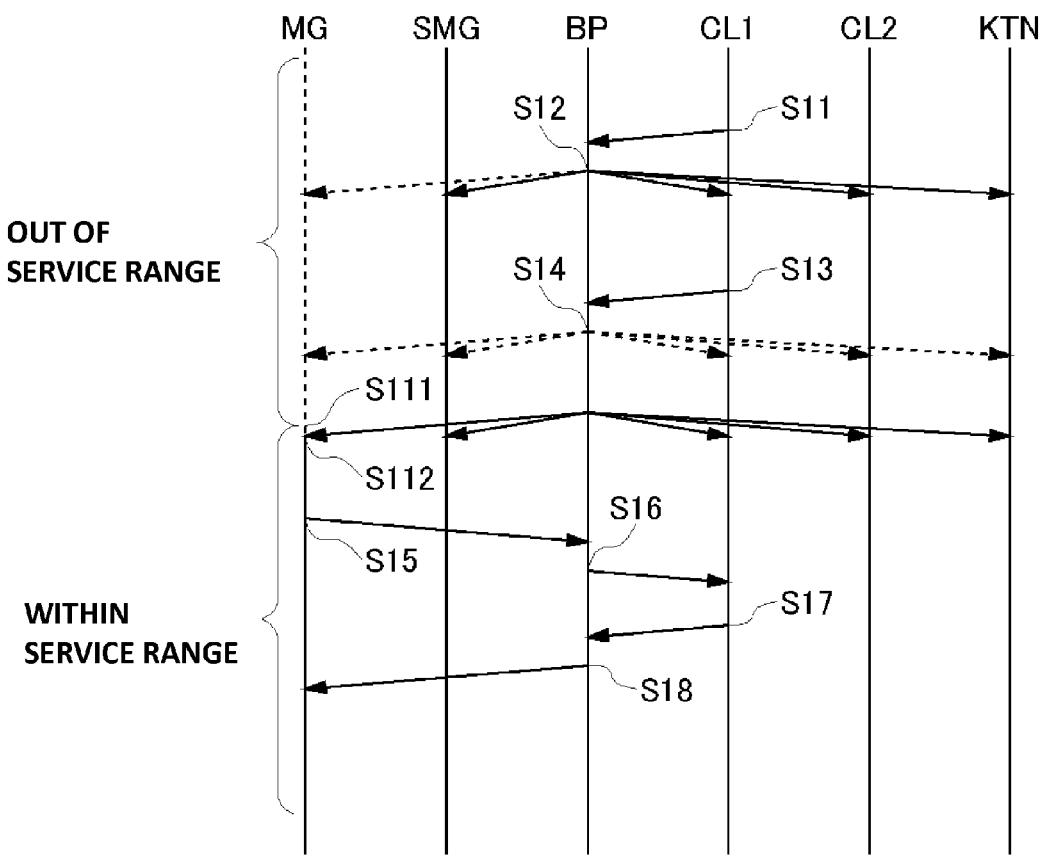
FIG. 12 is a view showing operation of emergency alert transmission in a second embodiment of the present invention.

FIG. 12 is a view showing operation of transmission of emergency alert in a second embodiment of the present invention. Operation steps identical to those in the first embodiment are designated by identical step numbers to omit detailed descriptions (this applies to subsequent embodiments). The schematic structure of the overall system of the present embodiment is similar to that of the first embodiment shown in FIGS. 2, 5, 6 and 7. When emergency alert operation is performed in a terminal having the emergency alert function (the store personnel 1 terminal 200c in the example of FIG. 12) and an emergency alert signal is transmitted to the center module 100 (step S11), the center module 100 broadcasts an emergency alert notification signal together with a warning sound signal according to a sound routing table for transmission of emergency alert shown in FIG. 11 (step S12).

In the example of FIG. 12, it is assumed that the manager terminal 200a is outside a service range of the center module 100 during transmission of the emergency alert, so that the manager terminal 200a is unable to receive a warning sound signal from the center module 100. In a terminal which received the warning sound signal and the emergency alert notification signal, the control section 54 outputs the warning sound signal from the sound output section 57 and lights the lamp 36 to indicate reception of an emergency alert based on the received emergency alert notification signal. Then, when the center module 100 receives an emergency alert termination signal (step S13), the center module 100 terminates the broadcast communication of the warning sound signal (step S14). However, the center module 100 continues transmission of the emergency alert notification signal for a fixed period of time (for 5 minutes for example) after the broadcast communication of the warning sound signal is terminated.

In the example of FIG. 12, the manager terminal 200a moves back to the service range of the center module 100 at the time when the broadcast communication of the warning sound signal has been terminated but the emergency alert notification signal is still being transmitted (step S111), so that the manager terminal 200a can receive the signal transmitted from the center module 100. In this case, the manager terminal 200a receives only the emergency alert notification signal (step S112). Other terminals also receive only the emergency alert notification signal. When the terminals receive only the emergency alert notification signal and do not receive the warning sound signal relating thereto, the control section 54 blinks the lamp 36. More specifically, when the emergency alert notification signal is received together with the warning sound signal, the lamp 36 is lit, and thereafter only the emergency alert notification signal is received, the lamp 36 is blinked.

The manager, who returned to the service range of the center module 100 and recognized the blinking lamp 36, can transmit a connection request signal to the center module 100 by performing connection request operation (step S15). Subsequent processing is the same as that of the first embodiment.

Figure 13:
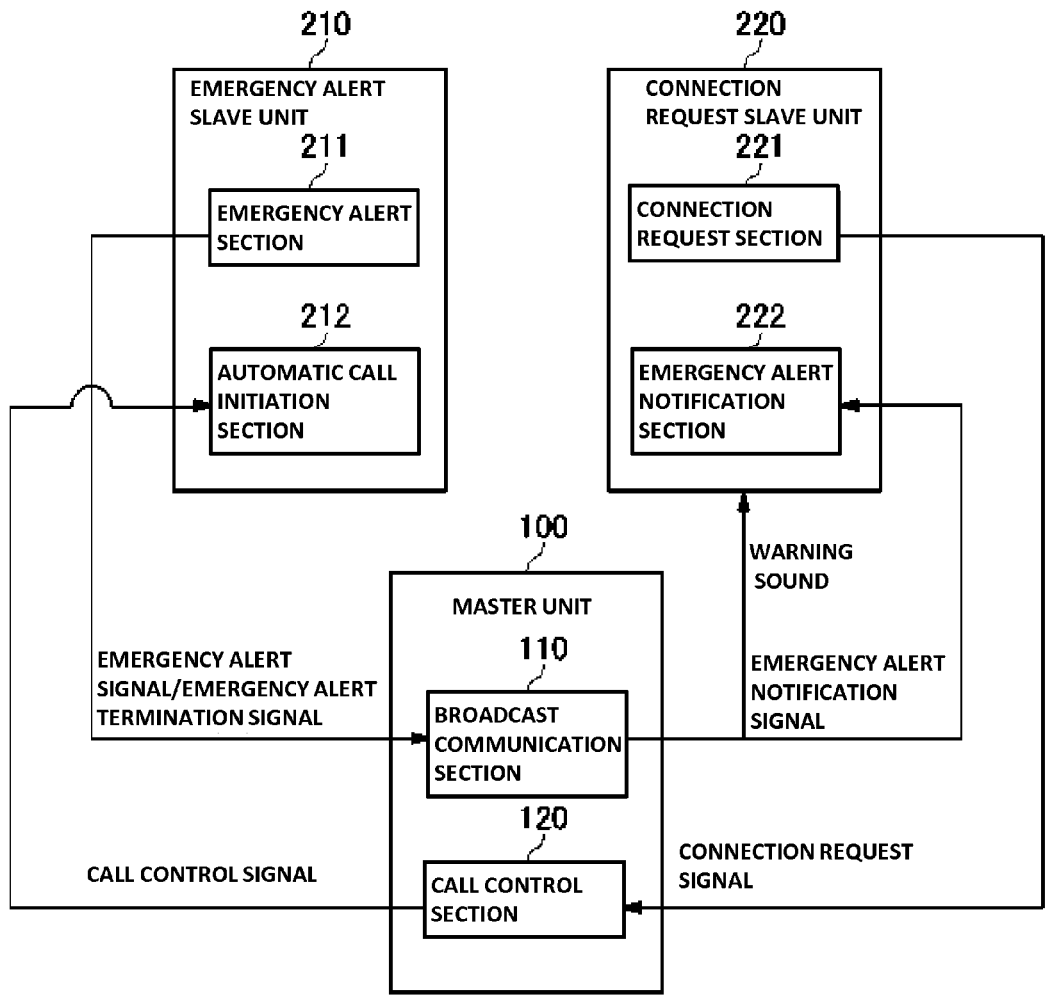
FIG. 13 is a view showing the structure of a wireless communication system for explaining operation of emergency alert transmission in the second embodiment of the present invention.

FIG. 13 is a view showing the structure of the wireless communication system for explaining operation of emergency alert transmission in the second embodiment of the present invention. Only the structural aspects relating to the present embodiment are shown in FIG. 13.

When the user performs emergency alert operation in the emergency alert terminal 210, the emergency alert section 211, in response to the operation, transmits an emergency alert signal to the center module 100. When the terminal 100 receives the emergency alert signal, the broadcast communication section 110 broadcasts, in response to the reception of the signal, a warning sound and an emergency alert notification signal to the terminals other than the emergency alert terminal. When the emergency alert terminal 210 receives the emergency alert notification signal, the emergency alert notification section 222 notifies the emergency alert. More specifically, the lamp 36 is lit up. When the user performs emergency alert termination operation in the emergency alert terminal 210, the emergency alert section 211, in response to the operation, transmits an emergency alert termination signal to the center module 100. When the terminal 100 receives the emergency alert termination signal, the broadcast communication section 110, in response to reception of the signal, terminates the broadcasting of the warning sound but continues the broadcasting of the emergency alert notification signal. In this case, the emergency alert notification section 222 blinks the lamp 36 in response to reception of the emergency alert notification signal.

When connection request operation is performed in the connection request terminal 220 which received the emergency alert notification signal, the connection request section 221, in response to the operation, transmits a connection request signal to the center module 100. When the connection request signal is received in the center module 100, the communication control section 120, in response to the reception of the signal, transmits a communication control signal to the emergency alert terminal 210. When the communication control signal is received in the emergency alert terminal 210, the automatic communication initiation section 212, in response to the reception of the signal, initiates a mutual one-on-one communication with the connection request terminal 220.

According to the operation of transmission of emergency alert in the present embodiment, even when a terminal could not receive the broadcasting of the emergency alert because of the reasons such as being outside the service range and the power being turned off while the emergency alert was being broadcasted, the terminal can receive an emergency alert notification signal if the terminal moves back to the service range thereafter. In that case, since the lamp 36 is lit or blinks, the user can find out that an emergency occurred or an emergency alert was transmitted, and therefore the user can perform connection request operation to perform a communication with the emergency alert terminal and confirm the situation.

Third Embodiment

Figure 14:
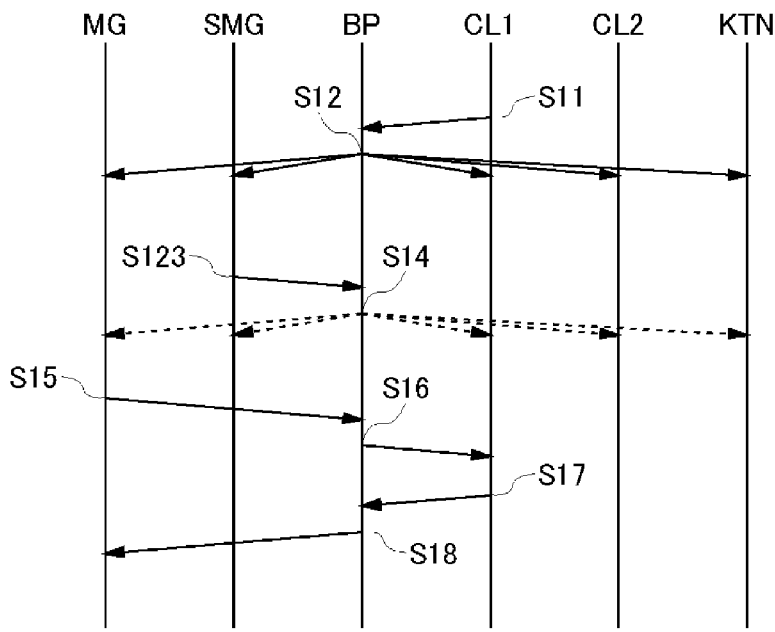
FIG. 14 is a view showing operation of emergency alert transmission in a third embodiment of the present invention.

FIG. 14 is a view showing operation of transmission of emergency alert in a third embodiment of the present invention. The schematic structure of the overall system of the present embodiment is similar to that of the first embodiment shown in FIGS. 2, 5, 6 and 7. In the first embodiment, the emergency alert sender performs emergency alert termination operation to transmit an emergency alert termination signal from the emergency alert terminal to the center module 100, and the center module 100 then terminates the broadcasting of the emergency alert. In the present embodiment, the user who received the broadcasting of the emergency alert can terminate transmission of the emergency alert by performing response operation.

FIG. 14 shows an example in which the sub-manager performs response operation. More specifically, when the receive button 356 is pressed in the terminal which received the broadcasting of an emergency alert (response operation), the control section 54 controls the transmission/reception section 51 to transmit a response signal to the center module 100 (step S123). The structure for transmitting the response signal in the terminal corresponds to the "response section" of the present invention. The terminal which transmits the response signal is referred to as "response terminal."

Upon reception of the response signal, the center module 100 terminates the broadcasting of the emergency alert in response to the reception of the signal (step S14). Other operation steps are similar to those of the first embodiment.

Figure 15:
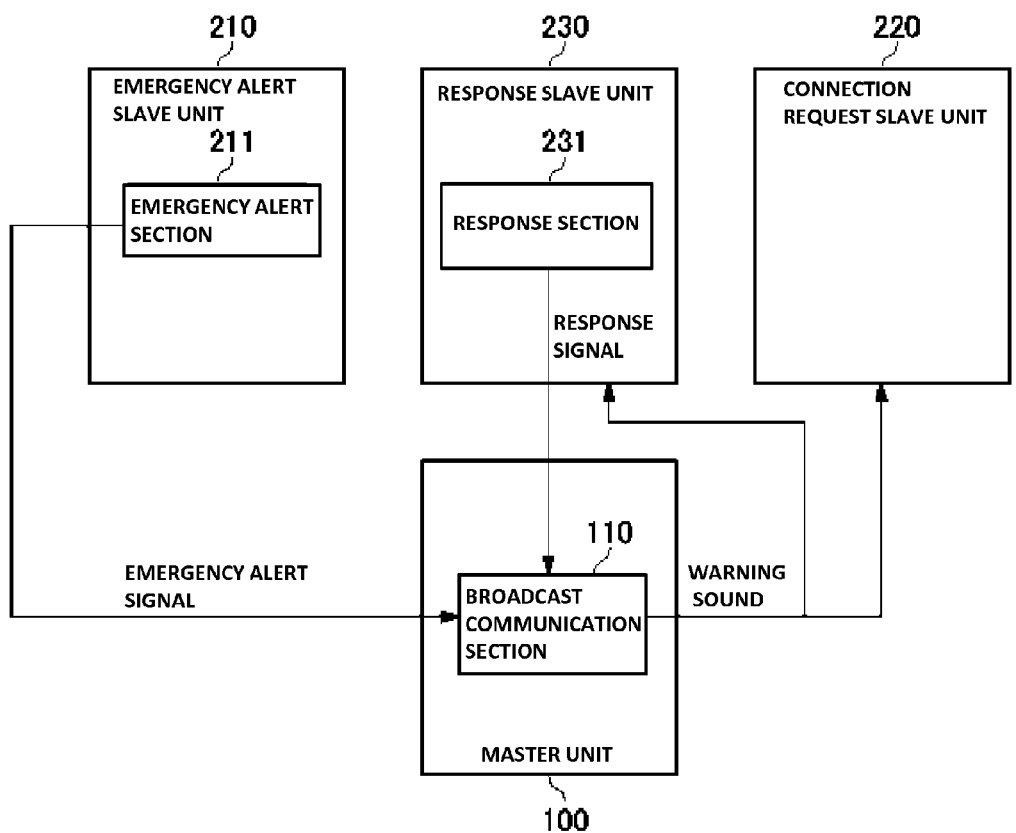
FIG. 15 is a view showing the structure of a wireless communication system for explaining operation of emergency alert transmission in the third embodiment of the present invention.

FIG. 15 is a view showing the structure of the wireless communication system for explaining operation of emergency alert transmission in the third embodiment of the present invention. Only the structural aspects relating to the present embodiment are shown in FIG. 15.

When the user performs emergency alert operation in the emergency alert terminal 210, the emergency alert section 211, in response to the operation, transmits an emergency alert signal to the center module 100. When the terminal 100 receives the emergency alert signal, the broadcast communication section 110, in response to the reception of the signal, broadcasts a warning sound to the terminals other than the emergency alert terminal.

When response operation is performed in a response terminal 230 which received the warning sound, a response section 231, in response to the operation, transmits a response signal to the center module 100. When the center module 100 receives the response signal, the broadcast communication section 110, in response to the reception of the signal, terminates the broadcasting of the warning sound.

According to the present embodiment, users other than the emergency alert sender can terminate the emergency alert transmission, and therefore when the user (emergency alert sender) who performed emergency alert operation by mistake is panicked by the incorrect alert and is unable to perform emergency alert termination operation because of the reasons such as being unfamiliar with the device, other users can terminate transmission of the emergency alert in place of the emergency alert sender. Moreover, the termination of transmission of the emergency alert without the emergency alert sender performing emergency alert termination operation can assure the emergency alert sender that other users made a response, i.e., the emergency alert was acknowledged.

Fourth Embodiment

Figure 16:
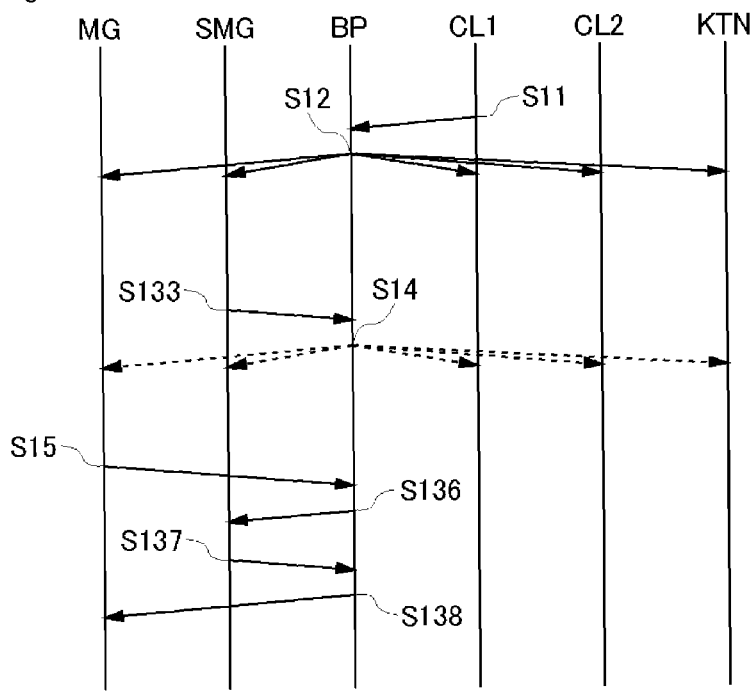
FIG. 16 is a view showing operation of emergency alert transmission in a fourth embodiment of the present invention.

FIG. 16 is a view showing operation of transmission of emergency alert in a fourth embodiment of the present invention. The schematic structure of the overall system of the present embodiment is similar to that of the first embodiment shown in FIGS. 2, 5, 6 and 7. In the third embodiment, when a connection request is made after the emergency alert was terminated by a user other than the emergency alert sender, a communication is initiated between the connection request terminal and the emergency alert terminal (steps S16-S18 of FIG. 14). In the present embodiment, when an emergency alert is terminated by a user other than the emergency alert sender, a communication is initiated between a connection request terminal and a terminal which terminated the emergency alert.

For this reason, in the present embodiment, the terminal which transmits an emergency alert termination signal also transmits its own terminal ID to the center module 100 together with the emergency alert termination signal (step S133), and the center module 100 stores the terminal ID. Upon reception of a connection request signal from the connection request terminal, the center module 100 refers to the terminal ID of the terminal which transmitted the emergency alert termination signal and transmits to this terminal a communication control signal (step S136). The control section 54 of the terminal which received the communication control signal (i.e., the terminal which terminated the emergency alert) initiates a communication with the connection request terminal in response to the reception of the communication control signal (step S137, S138). According to the present embodiment, the connection request terminal can perform a communication with the terminal which terminated the broadcasting of the emergency alert to confirm the state of the emergency.

Fifth Embodiment

Figure 17:
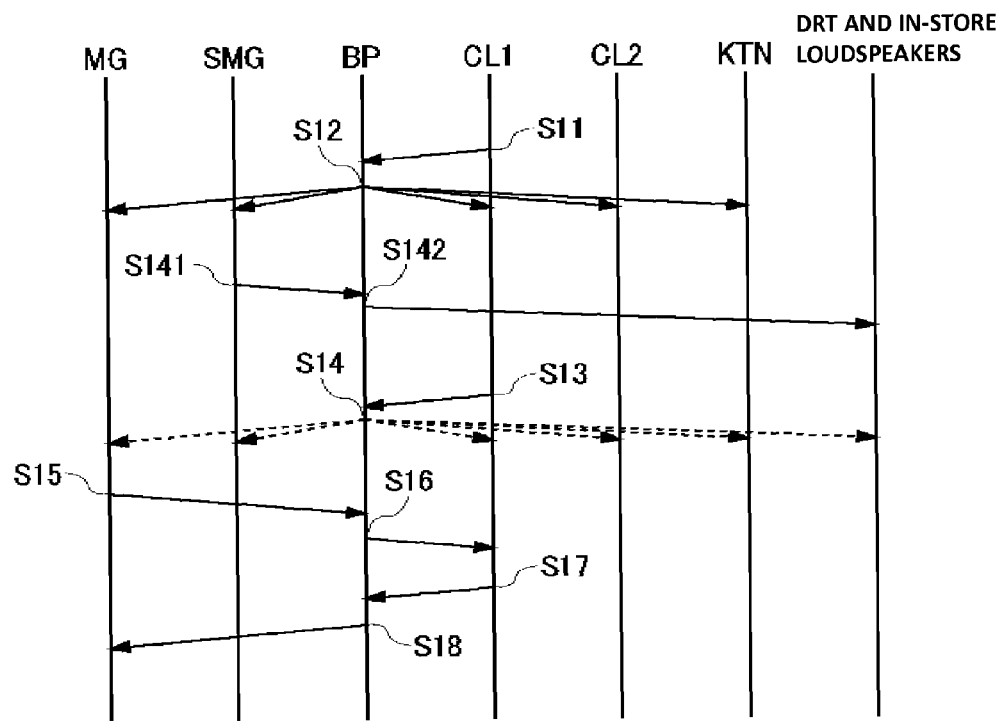
FIG. 17 is a view showing operation of emergency alert transmission in a fifth embodiment of the present invention.
Figure 18:
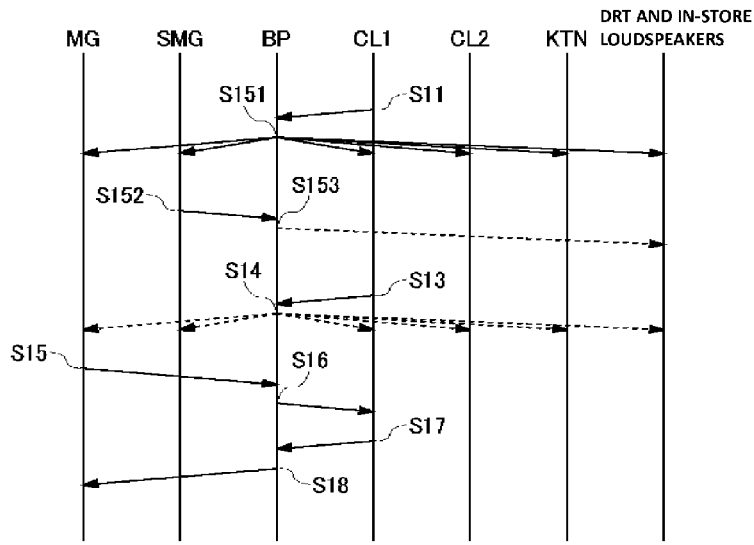
FIG. 18 is a view showing operation of emergency alert transmission in the fifth embodiment of the present invention.

FIGS. 17 and 18 are views showing operation of transmission of emergency alert in a fifth embodiment of the present invention. The schematic structure of the overall system of the present embodiment is similar to that of the first embodiment shown in FIGS. 2, 5, 6 and 7. In the present embodiment, upon reception of an emergency alert signal from the emergency alert terminal, the center module 100 can transmit a warning sound signal also to the menu board 200g which outputs a sound signal from a speaker and to other speakers placed in the store. In this case, the center module 100 may transmit a warning sound signal to the menu board 200g by radio communication and transmit a warning sound signal to other speakers by cable communication. Moreover, although not shown in the drawings, the center module 100 may further transmit the warning sound signal to the telephone terminal 200e, so that the warning sound signal may be transmitted to the outside (security company for example) from the terminal 200e with use of an outside telephone line. In the present embodiment in particular, the default setting of whether or not the warning sound signal is transmitted to the outsider can be changed, and also the setting of whether or not the warning sound signal is transmitted to the outsider can be changed even during transmission of the emergency alert.

FIG. 17 shows the operation steps of transmitting the warning sound signal to the menu board 200g and the in-store speaker and outputting the warning sound signal therefrom when an emergency alert is made with a default setting that the warning sound signal is not to be transmitted to the menu board 200g and the in-store speaker. Upon reception of an emergency alert signal, the center module 100, according to the default setting as in the first embodiment, broadcasts the warning sound signal to the manager terminal 200a, the sub-manager terminal 200b, the store personnel 1 terminal 200c, the store personnel 2 terminal 200d, and the kitchen terminal 200f, and does not transmit the warning sound signal to the menu board 200g and the in-store speaker.

If the user of the terminal which received the warning sound signal (the sub-manager in the example of FIG. 17) determines that the warning sound needs to be outputted in the menu board 200g and the in-store speaker, the user presses the receive button 356 and the emergency alert button 357 on his/her terminal simultaneously for a longer time (for 2 seconds for example) (speaker control operation). In response to the speaker control operation, the control section 54 of the terminal controls the transmission/reception section 51 to transmit a speaker control signal to the center module 100 (step S141). The terminal which transmits the speaker control signal is referred to as "speaker control terminal."

The center module 100 which received the speaker control signal transmits a warning sound signal to the menu board 200g and the in-store speaker in response to the reception of the speaker control signal (step S142). Upon reception of the warning sound signal from the center module 100, the menu board 200g and the in-store speaker output the signal from the speaker. Subsequent processing is the same as that of the first embodiment.

FIG. 18 shows the operation step of preventing the warning sound signal from being transmitted to the menu board 200g and the in-store speaker when an emergency alert is made with the default setting that the warning sound signal is to be transmitted to the menu board 200g and the in-store speaker. Upon reception of an emergency alert signal, the center module 100, according to the default setting, transmits the warning sound signal not only to the manager terminal 200a, the sub-manager terminal 200b, the store personnel 1 terminal 200c, the store personnel 2 terminal 200d, and the kitchen terminal 200f, but also to the menu board 200g and the in-store speaker by broadcast communication (step S151).

If the user of the terminal which received the warning sound signal (the sub-manager in the example of FIG. 18) determines that the output of the warning sound to the menu board 200g and the in-store speaker needs to be cancelled, the user presses the receive button 356 and the emergency alert button 357 on his/her terminal simultaneously for a longer time (for 2 seconds for example) (speaker control operation). In response to the speaker control operation, the control section 54 of the terminal controls the transmission/reception section 51 to transmit a speaker control signal to the center module 100 (step S152).

The center module 100 which received the speaker control signal stops transmitting the warning sound signal to the menu board 200g and the in-store speaker in response to the reception of the speaker control signal (step S153). As a result, the output of the warning sound from the menu board 200g and the in-store speaker is stopped. Subsequent processing is the same as that of the first embodiment.

Figure 19:
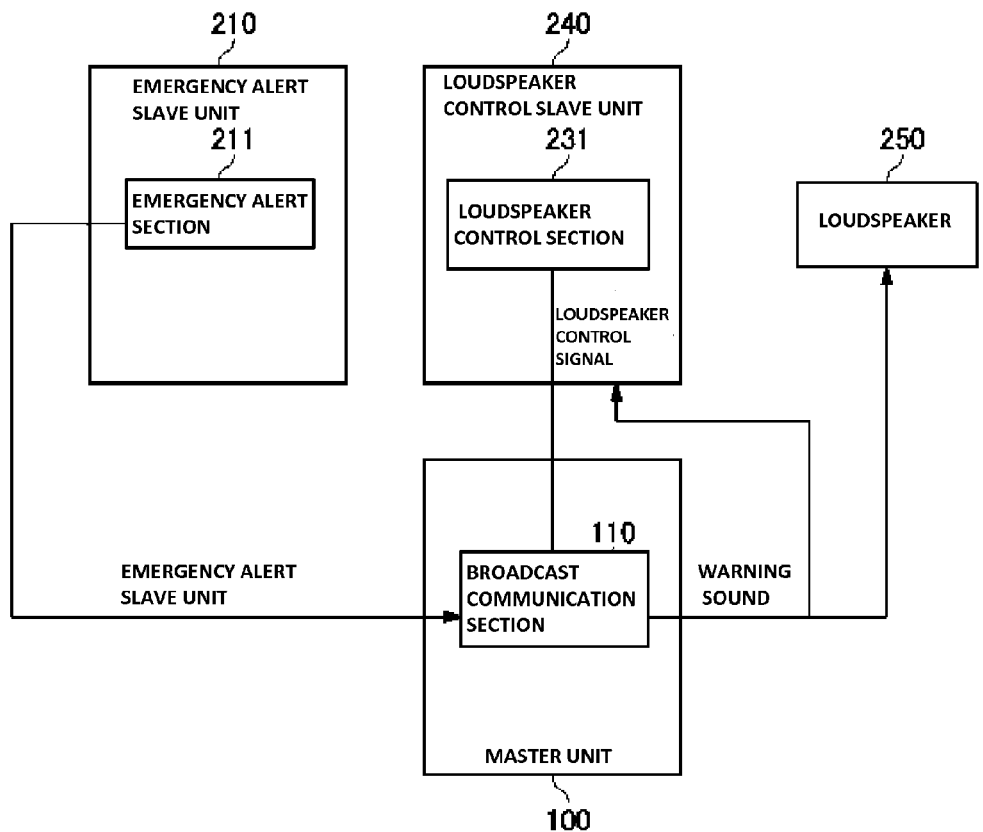
FIG. 19 is a view showing the structure of a wireless communication system for explaining operation of emergency alert transmission in the fifth embodiment of the present invention.

FIG. 19 is a view showing the structure of the wireless communication system for explaining operation of emergency alert transmission in the fifth embodiment of the present invention. Only the structural aspects relating to the present embodiment are shown in FIG. 19. In FIG. 19, a speaker 250 corresponds to other speakers including the above-stated speaker of the menu board 200g and the in-store speaker.

When the user performs emergency alert operation in the emergency alert terminal 210, the emergency alert section 211, in response to the operation, transmits an emergency alert signal to the center module 100. When the terminal 100 receives the emergency alert signal, the broadcast communication section 110, in response to the reception of the signal, broadcasts the warning sound to the terminals other than the emergency alert terminal and to the speaker 250.

When speaker control operation is performed in a speaker control terminal 240 during broadcasting of the warning sound from the center module 100, a speaker control section 241, in response to the operation, transmits a speaker control signal to the center module 100. Upon reception of the speaker control signal, the center module 100 stops or starts transmitting the warning sound to the speaker 250.

According to the operation steps of the emergency alert in the present embodiment, the warning sound may be set to be outputted or not to be outputted from the speaker by default, and when an emergency alert is made, the default setting may be changed depending on the nature of the emergency alert or the emergency so that the warning sound is outputted or not outputted from the speaker. As a result, it becomes possible to avoid unnecessary confusion caused by making customers hear an unnecessary warning sound, and in the case such as immediate evacuation being required, it becomes possible to operate the device so that the warning sound is outputted from the speaker and many people can hear the warning sound.

It is to be noted that the speaker control operation may be performed by the emergency alert sender himself. Although the speaker control operation for turning on the output of the warning sound from the menu board 200g and the in-store speaker is the same as the speaker control operation for turning off the output thereof, these operations may be made different from each other. The structure for transmitting the speaker control signal in the terminal of the present embodiment corresponds to the "speaker control section" of the present invention.

Sixth Embodiment

Figure 20:
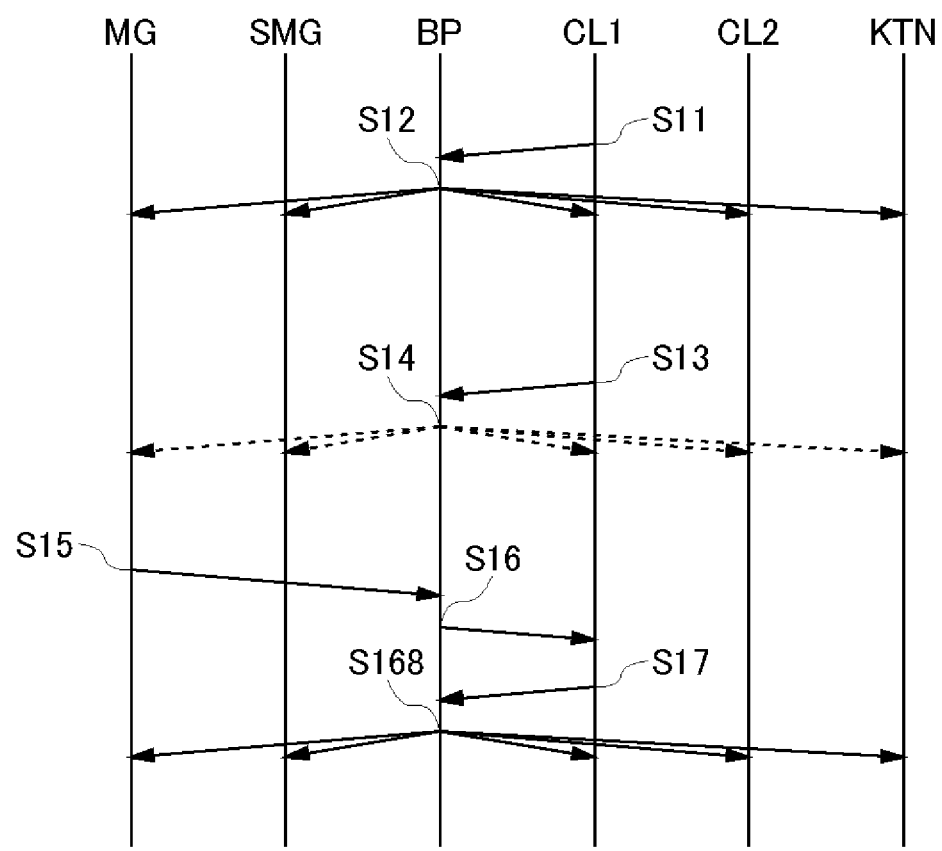
FIG. 20 is a view showing operation of emergency alert transmission in a sixth embodiment of the present invention.

FIG. 20 is a view showing operation of transmission of emergency alert in a sixth embodiment of the present invention. The schematic structure of the overall system of the present embodiment is similar to that of the first embodiment shown in FIGS. 2, 5, 6 and 7. In the above-stated first thru/or fifth embodiment, when a connection request is made, the center module 100 initiates a mutual one-on-one communication between the emergency alert terminal and the connection request terminal. In the present embodiment, when a connection request is made, broadcast communication is initiated between an emergency alert terminal and a plurality of other terminal. The operation up to the steps of performing emergency alert operation in the terminal having the emergency alert function, transmitting an emergency alert signal to the center module 100, transmitting the warning sound signal by broadcast communication from the center module 100, and then making a connection request after the emergency alert is terminated is similar to that of the first embodiment.

In the present embodiment, when a connection request signal is transmitted from some terminal (the manager terminal 200a in the example of FIG. 20), the center module 100 transmits a communication control signal to the emergency alert terminal (the store personnel 1 terminal 200c in the example of FIG. 20) (step S16). Upon reception of the communication control signal, the store personnel 1 terminal 200c that is an emergency alert terminal transmits a sound signal generated in the sound input section 58 to the center module 100 via the transmission/reception section 51 under the control of the control section 54 (step S17), and the center module 100 transmits the sound signal from the emergency alert terminal to the terminals other than the emergency alert terminal according to the sound routing table for transmission of emergency alert (see FIG. 10) (step S168).

Figure 21:
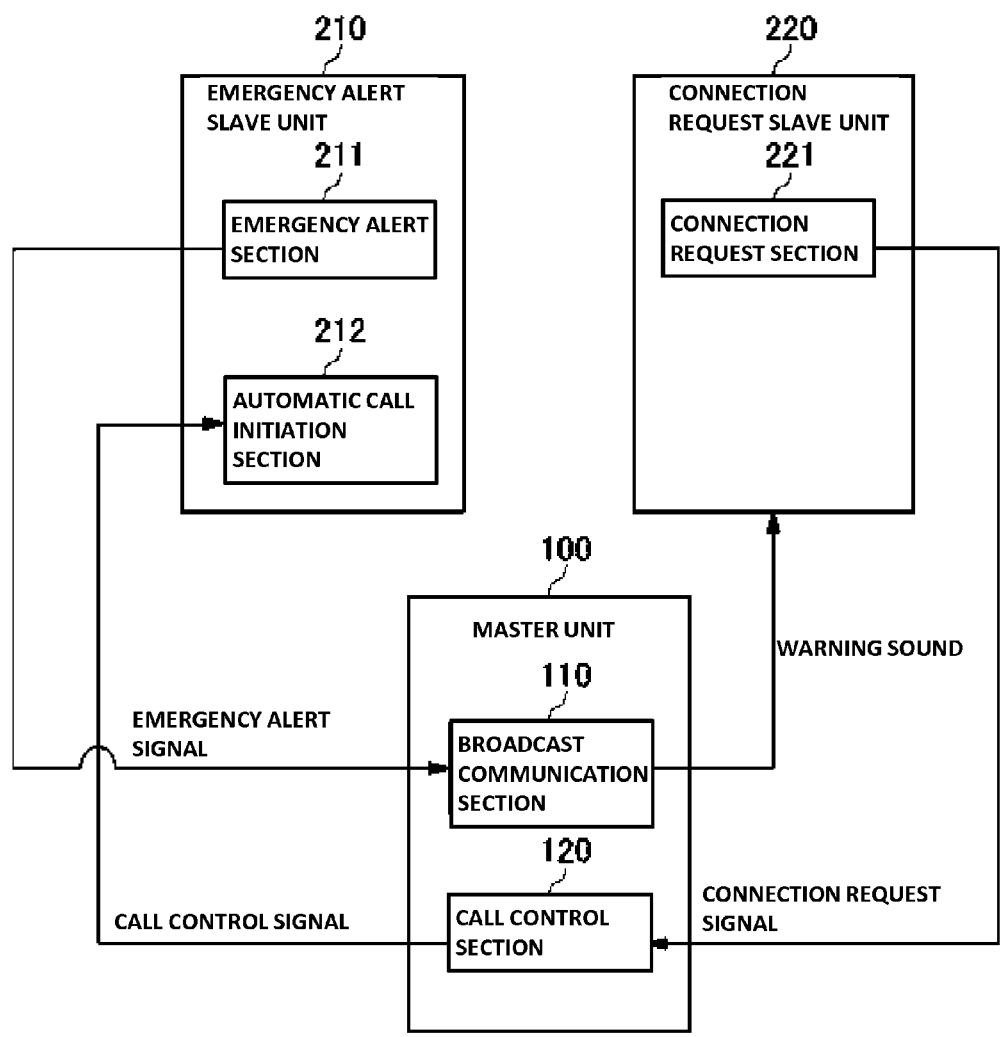
FIG. 21 is a view showing the structure of a wireless communication system for explaining operation of emergency alert transmission in the sixth embodiment of the present invention.

FIG. 21 is a view showing the structure of the wireless communication system for explaining operation of transmission of emergency alert in the sixth embodiment of the present invention. Only the structural aspects relating to the present embodiment are shown in FIG. 21.

When the user performs emergency alert operation in the emergency alert terminal 210, the emergency alert section 211, in response to the operation, transmits an emergency alert signal to the center module 100. When the terminal 100 receives the emergency alert signal, the broadcast communication section 110, in response to the reception of the signal, broadcasts the warning sound to the terminals other than the emergency alert terminal. When the user performs emergency alert termination operation in the emergency alert terminal 210, the emergency alert section 211, in response to the operation, transmits an emergency alert termination signal to the center module 100. When the terminal 100 receives the emergency alert termination signal, the broadcast communication section 110, in response to the reception of the signal, terminates the broadcasting of the warning sound.

When connection request operation is performed in the connection request terminal 220, the connection request section 221, in response to the operation, transmits a connection request signal to the center module 100. When the connection request signal is received in the center module 100, the communication control section 120, in response to the reception of the signal, transmits a communication control signal to the emergency alert terminal 210. When the communication control signal is received in the emergency alert terminal 210, the automatic communication initiation section 212, in response to the reception of the signal, initiates a communication with other terminals by broadcast communication.

According to the present embodiment, when a call of the emergency alert terminal is initiated by the connection request signal, the sound signal from the emergency alert terminal is transmitted to other terminals by broadcast communication, so that the users of other terminals can understand the details of the emergency. The above-stated second thru/or fifth embodiment may be applied to the sixth embodiment.

Although the first thru/or sixth embodiments were described hereinbefore, the further modifications shown below may be made to these embodiments. First, in the above-stated embodiments, at the time of transmission of emergency alert, an emergency alert signal is transmitted from the emergency alert terminal to the center module 100, and the center module 100 transmits a prestored warning sound signal. In contrast thereto, at the time of transmission of emergency alert, the emergency alert terminal may transmit a voice sound signal of the emergency alert sender generated in the sound input section 58 to the center module 100, and the center module 100 may broadcast the voice sound signal of the emergency alert sender to other terminals. In this case, in order to notify users of other terminals that the call is an emergency alert, the center module 100, in response to reception of the emergency alert signal, may broadcast a warning sound first and then transmit the voice sound signal of the emergency alert sender. The warning sound may be an announcement sound announcing "emergency occurred" and the like instead of the beep sound.

In the above description, the operation of the center module 100 transmitting a transmission object signal only to a specific terminal or not transmitting a transmission object signal to a specific terminal includes the operation steps of: the center module 100 transmitting a transmission object signal together with a control signal having specified reception targets; all the terminals receiving the transmission object signal; and then the terminals included in the reception targets processing the received transmission object signal whereas the terminals not included in the reception targets discarding the received transmission object signal.

The sound routing tables shown in FIGS. 8-10 may be rewritable and/or addition may be made thereto. Particularly, in the case where a plurality of terminals may arbitrarily be set as specific terminals as described above, it is necessary to rewrite the sound routing tables or addition may be made thereto depending on the specific terminal setting. Also in the case where the specific terminals and the general terminals are fixed, rewriting of or addition to the sound routing tables conveniently allows change or addition of sound routing tables. Rewriting of and addition to the sound routing tables may directly be performed in the center module 100, or the manager terminal 200a may be provided with an input section to perform the rewriting and addition therein.

Although in the page mode, specific terminals have a preferentially assigned communication channel whereas other terminals do not have a preferentially assigned communication channel in the above embodiments, a plurality of priority levels may be provided for preferential assignment. For example, the priority may be defined in a phased manner in the order of terminals for the manager, the sub-manager, the leader clerk, and the general clerk. In that case, when a plurality of terminals compete in preferential assignment of the voice slot in the page mode, the slot is assigned to the terminal with a higher priority.

The emergency alert operation, connection request operation, emergency alert termination operation, response operation, and speaker control operation in the above-stated embodiments may be other button operations. Particularly, the operation of simultaneously pressing two buttons may be replaced with the operation of pressing a button provided exclusively for the operation.

Although preferable embodiments of the present invention conceivable at the present moment have been described above, it should be understood that various modifications are possible for the embodiments disclosed and unless departing from the spirit and scope of the invention, such modifications are intended to be embraced in the scope of the appended claims.

INDUSTRIAL APPLICABILITY

Thus, in the wireless communication system according to the present invention, an emergency alert is broadcasted by a terminal having an emergency alert function. To acquire further information from the emergency alert sender in a terminal having a connection request function after the broadcasting of the emergency alert, a connection request signal is transmitted from the terminal having the connection request function so that the terminal of the emergency alert sender is automatically put in a communicable state. Consequently, even when another user, who hopes to acquire further information after termination of the emergency alert transmission, does not know who the emergency alert sender is, a call with the terminal of the emergency alert sender can be established only by transmitting the connection request signal from the terminal of the another user having the connection request function. Moreover, once the connection request signal is transmitted, a communication is automatically initiated in the terminal of the emergency alert sender, and therefore even when the emergency alert sender is in the situation where operation to initiate a communication with other terminals is impossible, the emergency alert sender can establish a communication with other terminals after termination of the emergency alert, which perform s the wireless communication system of the present invention useful as such a system that allows emergency alert transmission from a terminal.

REFERENCE SIGNS LIST 1 wireless communication system
100 center module
110 broadcast communication section
120 communication control section
200a manager terminal
200b sub-manager terminal
200c store personnel 1 terminal
200d store personnel 2 terminal
200e telephone terminal
200f kitchen terminal
200g menu board
200a1, 200b1, 200c1, and 200d1 terminal main body
200a2, 200b2, 200c2, 200d2 headset
31 holder band
32 holder pad
33 earphone
34 microphone
35 operation section
36 lamp
210 emergency alert terminal
211 emergency alert section
212 automatic communication initiation section
220 connection request terminal
221 connection request section
222 emergency alert notification section
230 response terminal
231 response section
240 speaker control terminal
241 speaker control section
250 speaker
351 page mode communication button
352 lane change button
353 talk mode communication button
354 volume-down button
355 volume-up button
356 receive button
357 emergency alert button
51 transmission/reception section
52 operation section
53 notification section
54 control section
55 detection section
56 storage section
57 sound output section
58 sound input section
71 transmission/reception section
72 operation section
73 control section
74 detection section
75 storage section

The invention claimed is:

1. A wireless communication system used in a restaurant, comprising a wireless communication center module and a plurality of wireless communication terminals which perform a wireless communication with each other via the wireless communication center module, wherein a plurality of the wireless communication terminals have an emergency alert function, while some of the wireless communication terminals further have a connection request function, the wireless communication terminal having the emergency alert function comprises an emergency alert section for broadcasting an emergency alert, the emergency alert section transmits an emergency alert signal to the wireless communication center module in response to user's emergency alert operation by executing the emergency alert function, the wireless communication terminal having the connection request function further to the emergency alert function comprises a connection request section for transmitting a connection request signal to a wireless communication terminal which transmitted the emergency alert, the connection request section transmits a connection request signal to the wireless communication center module in response to user's connection request operation by executing the connection request function, the wireless communication center module comprises: a broadcast communication section for broadcasting, in response to reception of the emergency alert signal, the emergency alert to the wireless communication terminals other than the wireless communication terminal which transmitted the emergency alert signal; and a communication control section for transmitting, in response to reception of the connection request signal, a communication control signal to put the wireless communication terminal which transmitted the emergency alert in a communicable state, and the wireless communication terminal comprises an automatic communication initiation section for automatically allowing, in response to reception of the communication control signal, a communication with the wireless communication terminal which transmitted the connection request signal.

2. The wireless communication system according to claim 1, wherein the broadcast communication section of the wireless communication center module preferentially reserves a communication channel used for the wireless communication to broadcast the emergency alert.

3. The wireless communication system according to claim 1, wherein a plurality of the wireless communication terminals include a wireless communication terminal having a response function, the wireless communication terminal having the response function comprises a response section for transmitting a response signal for responding to the emergency alert in accordance with specified operation by the user, and the broadcast communication section terminates broadcasting of the emergency alert in response to reception of the response signal.

4. The wireless communication system according to claim 1, wherein some wireless communication terminals out of a plurality of the wireless communication terminals comprise a speaker, some wireless communication terminals out of a plurality of the wireless communication terminals comprise a speaker control section for transmitting a speaker control signal for controlling so that the sound of the emergency alert is outputted or not outputted from the speaker, and the broadcast communication section of the wireless communication center module sets to transmit or not to transmit the sound of the emergency alert to the wireless communication terminal having the speaker in response to reception of the speaker control signal.

5. A wireless communication system used in a restaurant, comprising:

a wireless communication center module; and a plurality of the wireless communication terminals, a plurality of the wireless communication terminals performing a wireless communication with each other via the wireless communication center module with use of a plurality of communication channels, a first wireless communication terminals and a second wireless communication terminals being included in a plurality of the wireless communication terminals, the first wireless communication terminal having a dedicated communication channel and the second wireless communication terminal having a plurality of communication channels different from the dedicated communication channel, wherein the second wireless communication terminal performs broadcast communication to other wireless communication terminals by specified operation and transmits its own ID signal to the wireless communication center module, and if the first wireless communication terminal requests connection from the second wireless communication terminal which performed the broadcast communication after the second wireless communication terminal performs the broadcast communication, the wireless communication center module allows a communication only between the first wireless communication terminal and the second wireless communication terminal based on the received ID signal of the second wireless communication terminal.

6. The wireless communication system according to claim 5, wherein one of a plurality of the communication channels other than the communication channel dedicated to the first wireless communication terminal is preferentially used for the communication between the first wireless communication terminal and the second wireless communication terminals.

7. The wireless communication system according to claim 5, wherein the communication channel dedicated to the first wireless communication terminal is used for the communication between the first wireless communication terminal and the second wireless communication terminals.

* * * * *